(12) United States Patent
Meinders et al.

(10) Patent No.: US 9,238,902 B2
(45) Date of Patent: Jan. 19, 2016

(54) CAB SUSPENSION SYSTEM FOR A MACHINE ADAPTED TO SURFACE EXCAVATE ROCK OR LIKE MATERIALS

(75) Inventors: Glenn Meinders, Pella, IA (US); Guy Stephen Brock, Pella, IA (US); David William Gift, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 14/111,406

(22) PCT Filed: Apr. 16, 2012

(86) PCT No.: PCT/US2012/033745
§ 371 (c)(1),
(2), (4) Date: Oct. 11, 2013

(87) PCT Pub. No.: WO2012/142560
PCT Pub. Date: Oct. 18, 2012

(65) Prior Publication Data
US 2014/0225417 A1    Aug. 14, 2014

Related U.S. Application Data

(60) Provisional application No. 61/475,572, filed on Apr. 14, 2011.

(51) Int. Cl.
*E21C 47/00* (2006.01)
*E02F 9/16* (2006.01)
(Continued)

(52) U.S. Cl.
CPC .............. *E02F 9/166* (2013.01); *B60G 99/002* (2013.01); *B62D 33/0604* (2013.01); *E02F 5/08* (2013.01);
(Continued)

(58) Field of Classification Search
CPC ...... E01C 2301/30; E21C 47/00; E02F 9/166; B62D 33/0604
USPC ........... 299/39.4; 296/190.04, 190.05, 190.07
See application file for complete search history.

(56) References Cited

U.S. PATENT DOCUMENTS

| | | |
|---|---|---|
| 3,948,341 A | 4/1976 | Foster |
| 3,966,009 A | 6/1976 | Meacock, II et al. |

(Continued)

FOREIGN PATENT DOCUMENTS

| | | |
|---|---|---|
| CA | 2 129 785 C | 10/2001 |
| CN | 1194678 A | 9/1998 |

(Continued)

OTHER PUBLICATIONS

International Search Report for corresponding International Patent Application No. PCT/US2012/033745 mailed Oct. 30, 2012.

(Continued)

*Primary Examiner* — David Bagnell
*Assistant Examiner* — Michael Goodwin
(74) *Attorney, Agent, or Firm* — Merchant & Gould P.C.

(57) ABSTRACT

A system for providing suspension to a cab of an excavation machine such as a trencher or a surface mining machine. The system includes air cushions and elastomeric dampeners positioned between a platform and the cab. The air cushions allow for a larger displacement than the elastomeric dampeners. The air cushions have a lower natural frequency than the elastomeric dampeners. The elastomeric dampeners stabilize and support the cab in various degrees of freedom that are not supported by the air cushions.

29 Claims, 23 Drawing Sheets

(51) Int. Cl.
*B62D 33/06* (2006.01)
*E02F 5/08* (2006.01)
*E02F 9/08* (2006.01)
*E21C 25/06* (2006.01)
*B60G 99/00* (2010.01)

(52) U.S. Cl.
CPC .............. *E02F 9/0858* (2013.01); *E21C 25/06* (2013.01); *E21C 47/00* (2013.01); *B60G 2200/341* (2013.01); *B60G 2202/152* (2013.01); *B60G 2204/41* (2013.01); *E01C 2301/30* (2013.01)

(56) References Cited

U.S. PATENT DOCUMENTS

| | | | |
|---|---|---|---|
| 4,275,918 | A | 6/1981 | Franco |
| 4,427,090 | A | 1/1984 | Fredriksen et al. |
| 4,436,169 | A | 3/1984 | Jennerjohn et al. |
| 4,438,970 | A | 3/1984 | Boucher |
| 4,515,234 | A | 5/1985 | Lay et al. |
| 4,998,592 | A | 3/1991 | Londt et al. |
| 5,490,635 | A | 2/1996 | Gray |
| 5,551,826 | A * | 9/1996 | Todd et al. ............... 414/685 |
| 5,553,911 | A | 9/1996 | Bodin et al. |
| 5,590,041 | A | 12/1996 | Cooper |
| 5,984,036 | A | 11/1999 | Higuchi et al. |
| 6,073,714 | A | 6/2000 | McHorse et al. |
| 6,540,038 | B2 | 4/2003 | Taylor et al. |
| 6,758,294 | B2 | 7/2004 | Peddycord et al. |
| 6,948,265 | B2 | 9/2005 | Unzicker et al. |
| 6,986,545 | B2 | 1/2006 | Nilsson et al. |
| 7,198,125 | B2 | 4/2007 | Skelcher et al. |
| 7,240,754 | B2 | 7/2007 | Barton et al. |
| 7,290,360 | B2 | 11/2007 | Unzicker et al. |
| 7,300,100 | B2 | 11/2007 | McLean et al. |
| 7,331,627 | B2 | 2/2008 | Van Den Brink et al. |
| 7,600,808 | B2 | 10/2009 | Hinze et al. |
| 7,617,886 | B2 | 11/2009 | Hall |
| 7,648,193 | B2 | 1/2010 | Fujiwara et al. |
| 7,695,054 | B2 | 4/2010 | Haeusler et al. |
| 7,744,149 | B2 | 6/2010 | Murray et al. |
| 2003/0041487 | A1 | 3/2003 | Unzicker et al. |
| 2003/0146647 | A1 * | 8/2003 | Leitner et al. ............. 296/190.05 |
| 2003/0226700 | A1 * | 12/2003 | Peddycord et al. ........ 180/89.13 |
| 2006/0266573 | A1 * | 11/2006 | Ishii et al. ..................... 180/326 |
| 2007/0119078 | A1 | 5/2007 | Unzicker et al. |
| 2008/0258535 | A1 * | 10/2008 | Berning et al. .............. 299/39.4 |
| 2008/0272528 | A1 | 11/2008 | Yoshino |
| 2009/0045000 | A1 | 2/2009 | Brown |
| 2009/0133373 | A1 | 5/2009 | Leach et al. |
| 2009/0167057 | A1 | 7/2009 | Walter et al. |
| 2009/0302640 | A1 * | 12/2009 | Murray et al. ........... 296/190.07 |

FOREIGN PATENT DOCUMENTS

| | | |
|---|---|---|
| CN | 101294367 A | 10/2008 |
| DE | 35 31 854 A1 | 3/1987 |
| JP | 5-255950 A | 10/1993 |
| JP | 8-027838 A | 1/1996 |
| JP | 8-183483 A | 7/1996 |
| JP | 10-212738 A | 8/1998 |
| JP | 11-200417 A | 7/1999 |
| JP | 2003-238072 A | 8/2003 |
| JP | 2004-244163 A | 9/2004 |
| JP | 2006-168449 A | 6/2006 |
| JP | 2006-264501 A | 10/2006 |
| JP | 2006-265883 A | 10/2006 |
| JP | 2006-321295 A | 11/2006 |
| JP | 2007-176401 A | 7/2007 |
| JP | 2007/176402 A | 7/2007 |
| JP | 2007-177560 A | 7/2007 |
| JP | 2007-182683 A | 7/2007 |
| JP | 2007-182698 A | 7/2007 |
| JP | 9-217381 A | 8/2007 |
| JP | 2007-196712 A | 8/2007 |
| JP | 2007-285014 A | 11/2007 |
| JP | 2007-327190 A | 12/2007 |
| JP | 2008-038502 A | 2/2008 |
| JP | 2008-120176 A | 5/2008 |
| KR | 10-0175727 B1 | 4/1999 |
| WO | WO 89/01435 A1 | 2/1989 |
| WO | WO 91/04221 A1 | 4/1991 |
| WO | WO 2007/000133 A1 | 1/2007 |
| WO | WO 2007/117183 A1 | 10/2007 |
| WO | WO 2010/001204 A2 | 1/2010 |

OTHER PUBLICATIONS

Dey, K. et al. "Predicting "cuttability" with surface miners—A rockmass classification approach", Journal of Mines, Metals and Fuels, vol. 56, No. 5-6, May 2008, pp. 85-91.
"Mechanical Excavation.doc", Mar./Apr. 2011, pp. 1-17, www.docstoc.com/docs/76837509/7-Mechanical-Excavation.
CAT M318C MH/M322C MH Material Handler Product Sheet, Oct. 7, 2010, pp. 1-40, http://forestpro.cat.com/cda/files/303510/7/AEHQ5643_318C%20MH_322C%20MH.pdf.
Gross, A. et al. "Development of a 4-point-Air Cab Suspension System for Conventional Heavy Trucks", SAE International, International Truck and Bus Meeting and Exhibition, Chicago, IL, Nov. 2001, 7 pages.
Sindgikar, P. et al. "Design of Cabin Suspension Characteristics of Heavy Commercial Vehicle", SAE International, 2008 World Congress, Detroit, MI, Apr. 2008, 11 pages.
"Vermeer Hydrostatic Tractor T955 Commander", Vermeer Product Guide, 2010, 4 pages.
"Vermeer Rock Excavation Technology Terrain Leveler", Vermeer Product Guide, 2010, 8 pages.
"1R9-003 Air Springs", Good Year Product Guide, 2008, 2 pages.
"Heavy-Duty Replacement Products: Air Springs Super-Cushion", Good Year Product Guide, 2011, 4 pages.
"Cab Suspension for all Requirements", Freudenberg, Integral Accumulator GmbH & Co. KG Product Guide, 2011, 1 page.
"Off Highway Product Catalogue" Trelleborg, 2011, 43 pages.
Patricio, P. "Effects of Frame Design and Cab Suspension on the Ride Quality of Heavy Trucks", Virginia Polytechnic Institute and State University, Thesis, Jul. 3, 2002, 171 pages.
Edgar, J., "Springs and Natural Frequencies," autospeed.com, http://www.autospeed.com/cms/A_112279/printArticle.html, 3 pages (Dec. 31, 2007)—as provided.
Edgar, J., "Springs and Natural Frequencies," autospeed.com, http://www.autospeed.com/cms/A_112279/printArticle.html, 4 pages (2007)—as retrieved.
European Search Report for Application No. 12 770 693.5, mailed Apr. 29, 2015.
Chinese First Office Action of Feb. 28, 2015 of Application 201280018374.5 with English translation.
English Machine Translation of KR100175727B1, including English Abstract.

* cited by examiner

CAB SUSPENSION SYSTEM FOR A MACHINE ADAPTED TO SURFACE EXCAVATE ROCK OR LIKE MATERIALS

This application is a National Stage Application of PCT/US2012/033745, filed Apr. 16, 2012, which claims benefit of U.S. Provisional Patent Application Ser. No. 61/475,572, filed Apr. 14, 2011, and which applications are incorporated herein by reference. To the extent appropriate, a claim of priority is made to each of the above disclosed applications.

TECHNICAL FIELD

The present disclosure relates generally to excavation equipment. More particularly, the present disclosure relates to excavation machines adapted for excavating rock and like materials.

BACKGROUND

Rock is an indefinite mixture/aggregate of naturally occurring materials that mainly include minerals. Rocks from which minerals or metals can be mined for economic purposes are called ores. Man-made materials having properties similar to rock include concrete and asphalt.

Certain machines allow rock or like materials to be excavated from the earth's surface. Examples of this type of excavation machine include surface excavation machines (e.g., surface mining machines) and trenchers.

Surface excavation machines are used to level terrain and/or remove a layer of material from a given site location. Typical applications include surface mining, demolishing a road, and prepping a site for new construction or reconstruction. Example rocks that are excavated using surface excavation machines include limestone, gypsum, bauxcite, phosphate and iodide. Materials (e.g., ores) such as copper, iron, gold, diamonds and coal can also be excavated using surface excavation machines. Surface excavation machines provide an economical alternative to blasting and hammering. Furthermore, surface excavation machines provide the advantage of generating a consistent output material after a single pass. Therefore, surface excavation machines can reduce the need for primary crushers, large loaders, large haul trucks and the associated permits to transport materials to crushers.

A typical surface excavation machine includes a main chassis supporting an operator cab. The main chassis is supported on a ground drive system such as a plurality of tracks. An engine such as a diesel engine is mounted on the main chassis. The engine provides power for driving the various components of the machine. Often, the diesel engine powers a hydraulic system which includes various hydraulic motors and hydraulic cylinders included throughout the machine. An excavating tool is typically mounted at a rear end of the main chassis. The excavating tool can include a rotational excavating drum mounted on a pivotal boom. The excavating drum carries a plurality of cutting tools (e.g., carbide tipped teeth) suitable for cutting rock. An example surface excavation machine of the type described above is disclosed at U.S. Pat. No. 7,290,360, which is hereby incorporated by reference in its entirety.

Trenchers are used to excavate trenches in rock. Often, the trenches are excavated for the purpose of installing utilities/product such as electrical cable, fiber optic cable or pipe. A typical trencher can have the same basic components as a surface excavation machine, except the boom and excavating drum is replaced with a trenching attachment. The trenching attachment includes a boom on which a digging chain is rotatably mounted. Cutting tools suitable for cutting rock (e.g., carbide tipped teeth) are carried by the digging chain. An example surface excavation machine of the type described above is disclosed at U.S. Pat. No. 5,590,041, which is hereby incorporated by reference in its entirety.

Surface excavation machines and trenchers excavate rock using a process characterized by relatively high tooth loadings (e.g., via high horsepower and high weight provided to the teeth) and relatively low tooth tip speed. This type of excavation technique combined with the non-uniform nature of rock causes relatively high force, high displacement shock pulses to be transferred to the main chassis and cab as relatively large pieces of material are removed (e.g., torn, ripped, etc.) from an excavation location during excavation operations.

SUMMARY

The present disclosure relates to a rock excavation machine (e.g., a surface mining machine, trencher or like machine) that uses relatively high horsepower and relatively low cutting tip speeds to excavate rock or like materials. The excavation machine includes a cab supported on a main chassis. A suspension is provided between the cab and the main chassis. The suspension is configured to isolate the cab with respect to high force, high displacement shock pulses transferred to the machine during excavation operations. In one embodiment, the suspension includes an air cushion. In a preferred embodiment, the suspension substantially reduces noise within the cab.

DETAILED DESCRIPTION

Figure 1:
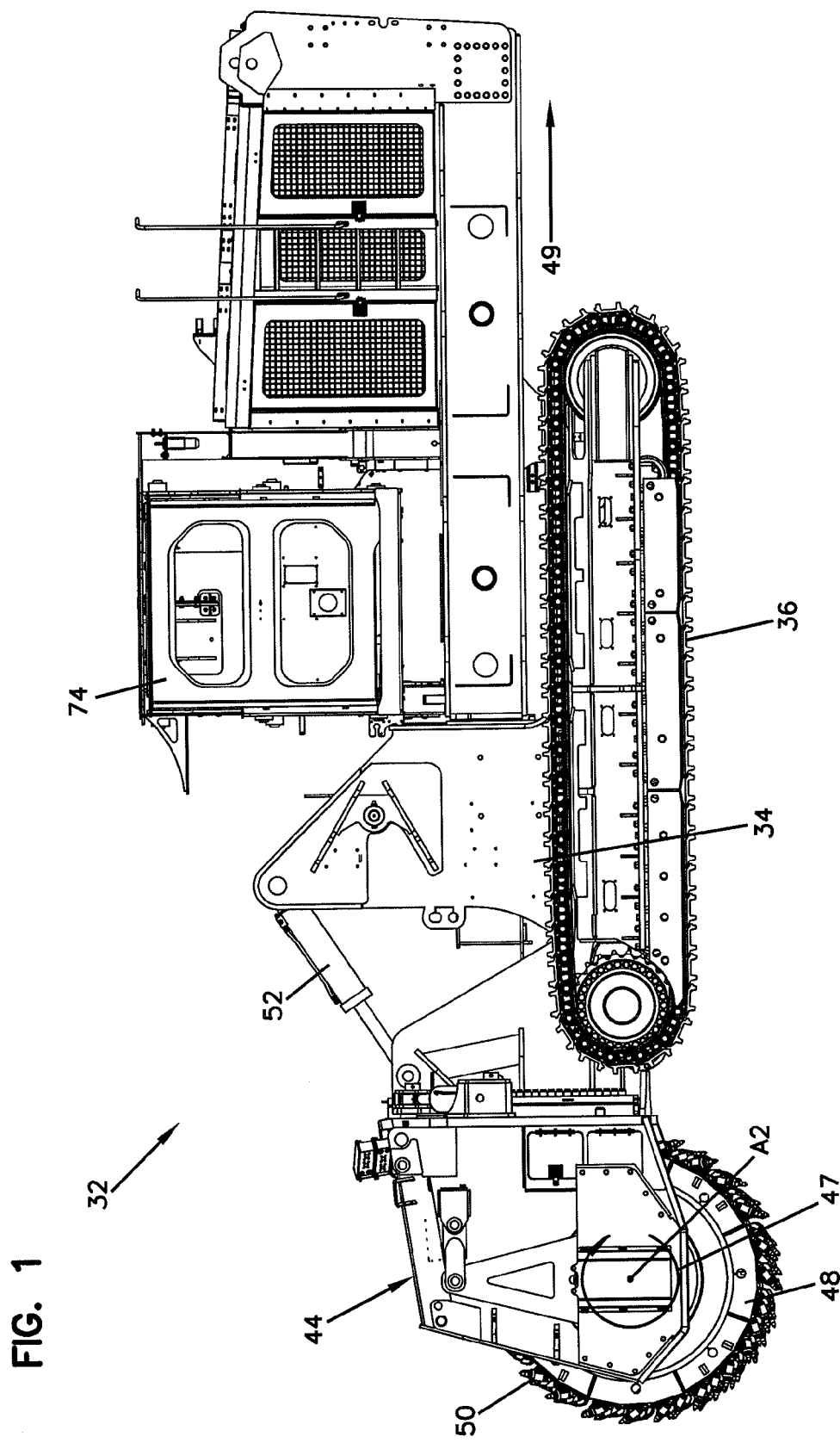
FIG. 1 is a side elevation view of a surface mining machine having a cab suspension in accordance with the principles of the present disclosure, the cab is shown in a lowered position.

The present disclosure relates to an operator cab system for an excavation machine such as a surface mining machine or trencher for excavating rock or like materials from the earth's surface. In the embodiment depicted herein, the surface excavation machine is a surface mining machine. The present disclosure illustrates a system for isolating an operator station (e.g., an operator cab) of the surface excavation machine from vibration and shock, and for substantially reducing noise in the cab.

Surface excavation (e.g., mining) machines and trenchers are typically designed to remove material at a high removal rate. The material may be hard material, may be non-homogeneous material, and may break apart in irregular shapes and sizes. It may be desired to remove material in large chunks to maximize production and/or increase energy efficiency of the surface excavation machine. Surface excavation machines and trenchers are typically powered by high horsepower engines which provide significant force to each cutting tip during excavation. During excavation of rock or like materials, high force provided to the cutting tips combined with low tip speeds results in an excavation process characterized by shock loads/displacements. The system of the present disclosure is adapted to isolate the operator station/cab from such displacements.

FIGS. 1-4 show a surface mining machine 32 in accordance with the principles of the present disclosure. The surface mining machine 32 includes a tractor having a main chassis 34 carried by a ground propulsion system having a plurality of tracks 36 (see, FIG. 4). The main chassis 34 generally extends along a length $L_M$ between a front 38 and a rear 40 of the surface mining machine 32. A first end portion 42 of the main chassis 34 is attached to a work attachment 44 (i.e., an excavation tool). In the depicted embodiment, the first end portion 42 corresponds to a rear end 46 of the surface mining machine 32. As depicted, the work attachment 44 includes a drum 48 that rotates about an axis of rotation A2 and carries a plurality of tools 50 (e.g., teeth having hardened tips such as carbide tips). As depicted, the axis of rotation A2 generally extends along a width $W_M$ of the surface mining machine 32 (see FIG. 3). One or more actuators 52 (e.g., hydraulic cylinders) may move the work attachment 44 relative to the main chassis 34. The actuator 52 may change an elevation $E_W$ of the work attachment 44 and thereby engage/disengage the tools 50 with material to be excavated 54. In the depicted embodiment, a boom 56 is pivotally mounted to the main chassis 34 adjacent the rear end 46 of the surface mining machine 32 about a boom pivot axis A4. The boom 56 projects rearwardly from a rear end of the tractor and functions to couple the drum 48 to the tractor. The boom 56 is pivoted about the boom pivot axis A4 by the actuator 52. The tracks 36 may propel the work attachment 44 into or away from the material to be excavated 54.

As mentioned above, the actuator 52 moves the work attachment 44 relative to the main chassis 34 and/or the tracks 36. By moving the work attachment 44, the actuator 52 also moves the drum 48 between a raised position 58, a lowered position 60 (see FIG. 4), and/or various positions in-between. When the actuator 52 moves in a first direction, the drum 48 is raised relative to the main chassis 34 and/or the tracks 36. When the actuator 52 moves in a second direction, the drum 48 is lowered relative to the main chassis 34 and/or the tracks 36. In the depicted embodiment, the drum 48 can be moved significantly below the tracks 36 (i.e., ground level 62) when in the lower position 60 and can be moved well above the tracks 36 (i.e., ground level 62) when in the raised position 58. As depicted, the drum 48 preferably rotates in a direction 47 that downcuts the material being removed 54 (see FIGS. 1 and 4). In 6 other embodiments, the drum 48 may rotate in the opposite direction and upcuts the material being removed 54.

In use of the surface mining machine 32, the surface mining machine 32 is moved to a desired excavation site while the excavation tool 44 is in the raised position 58. When it is desired to excavate at the excavation site, the work attachment 44 is lowered from the raised position 58 to the lowered position 60 (see FIG. 4). While in the lowered position 60, the excavation drum 48 is rotated in the direction 47 about the axis A2 such that the excavation drum 48 utilizes a down-cut motion to remove a desired thickness T of material. The down-cut motion causes the teeth 50 to engage/penetrate into the material 54 being excavated and then release as pieces of material break free. The pieces of material breaking free have non-uniform shapes with some of the shapes being relatively large (sometimes equal to 0.1 times a cutting diameter of $D_D$ the drum 48 or larger). As the tracks 36 move the mining machine 32 in a forward direction 49 (see FIG. 1), excavated material 70 passes under the drum 48 and is left behind the surface excavation machine 32. As the teeth 50 engage and then release from the cutting location, shock pulses/loads/vibrations are transferred from the work attachment 44 to the main chassis 34 and the cab 74, particularly when larger pieces of material break free. Shock loads are also generated when the drum 48 is lifted and then falls back down as larger pieces of material pass under the drum and are further reduced in size (see FIG. 4).

As depicted, an engine 64 is mounted at a second end portion 66 of the main chassis 34. In the depicted embodiment, the second end portion 66 corresponds to a front end 68 of the surface mining machine 32. The engine 64 powers the work attachment 44 and the tracks 36. The engine 64 may power the work attachment 44 and/or the tracks 36 via hydrostatic circuits.

In the depicted embodiment, the drum 48 has the cutting diameter $D_D$ (i.e., the diameter defined by the tips of the teeth 50 when the drum 48 is rotated) greater than 36 inches or greater than 72 inches or in the range of 72-120 inches. In the depicted embodiment, the drum 48 has a length $L_D$ greater than 96 inches or in the range of range of 96 to 200 inches. In other embodiments, the length $L_D$ is greater than a track width $T_W$ defined between vertical planes VP defined by outer edges of the propulsion structures (e.g., the tracks 36) of the surface mining machine 32.

In certain embodiments, the excavation drum 48 can cut to a cutting depth $D_C$ of at least 0.1 times the cutting diameter $D_D$ of the excavation drum 48, or at least 0.2 times the cutting diameter $D_D$ of the excavation drum 48, or at least 0.3 times the cutting diameter $D_D$ of the drum 48. The cutting depth $D_C$ is measured relative to a ground contact plane $P_C$ defined by bottom sides of the propulsion structures (e.g., the tracks 36). In certain embodiments, the drum 48 moves a vertical distance equal to at least 0.5 times the cutting diameter $D_D$ when the boom moves between the lowered and raised positions 60, 58.

As the material being removed 54 is often non-homogeneous, individual tooth strokes may have higher or lower values of energy delivered through them. For example, if a tooth/tool 50 encounters a chunk of rock 70 that has already been fractured away from the surrounding rock 54 by a previous tooth stroke, the energy delivered by the current tooth stroke may be significantly less than the average tooth stroke energy. Conversely, other tooth strokes may encounter particularly hard rock that has not yet been fractured. The energy delivered by this tooth stroke may be significantly more than the average tooth stroke energy. The individual tooth stroke energy delivered to a series of sequential tooth strokes may be somewhat random and depends, at least in part, on the material being removed 54. As relatively high amounts of energy are delivered to individual teeth 50, shock loads can be transmitted through the surface mining machine 32. The shock loads may be substantially equal in magnitude across a series of sequential tooth strokes (e.g., when mining homogenous material) or may be random in magnitude. As explained in detail below, an isolation system 72 of the present disclosure is effective in isolating individual random shock loads as well as repetitive shock loads.

Turning now to FIGS. 5-14, an example isolation system 72 of the present disclosure will be discussed in detail below. The isolation system 72 effectively isolates a cab 74 of the surface mining machine 32 from impacts and/or other loads generated by the tools 50 as they remove the material 54 being mined/excavated. The isolation system 72 may also isolate the cab 74 from other vibrations, shocks, and noises produce by the surface mining machine 32. It has been determined that the isolation system 72 can substantially reduce noise levels within the cab 74.

In the depicted embodiment, the cab 74 is designed to reduce the potential for injury to the operator should the surface mining machine 32 roll over (e.g., in an accident) by being designed to prevent the cab from being crushed in a roll over accident regardless of whether the cab remains attached to machine or becomes detached from the machine. This type of cab can be referred to as a ROM, an acronym for Roll Over Module, and should be able to withstand crushing loads applied by the machine from any direction. As the surface mining machine 32 is heavy, the ROM cab is also comparatively heavy. In the depicted embodiment, the cab weights at least 7,000 pounds. In other embodiments, the cab may weigh at least 5,000 pounds. The relatively large weight/mass of the cab 74, when combined with the suspension mechanism described herein, assists in dampening vibration applied to the cab 74 from the main chassis 34.

The cab 74 may include a frame 76, windows (not shown), a door (not shown), a machine control and information panel (not shown), an operator seat (not shown) supported on an operator platform/floor of the cab, sound and/or thermal insulation (not shown), and a climate control system (not shown). In certain embodiments, corner posts and roof framing members can have a construction including dual tubes 75 (e.g., steel tubes) with each tube having a rectangular cross-section. As depicted, the frame 76 of the cab 74 includes a series of attachment locations 78 positioned at an underside 80 of the cab 74. The attachment locations 78 are discussed in detail below.

In the depicted embodiment, the cab 74 is mounted to the main chassis 34 via a mounting platform 82. As depicted, the mounting platform 82 includes a frame 84 with an "L" shape configuration 86 (see FIG. 9). A horizontal leg 88 of the "L" shape configuration 86 includes a series of attachment locations 90 positioned at a topside 92 of the horizontal leg 88. The attachment locations 90 generally correspond to the attachment locations 78 of the frame 76 of the cab 74. The attachment locations 90 are discussed in detail below. A vertical leg 94 of the "L" shape configuration 86 of the frame 84 defines a first axis A6 and a second axis A8 that are further described below (see FIG. 11).

Figure 2:
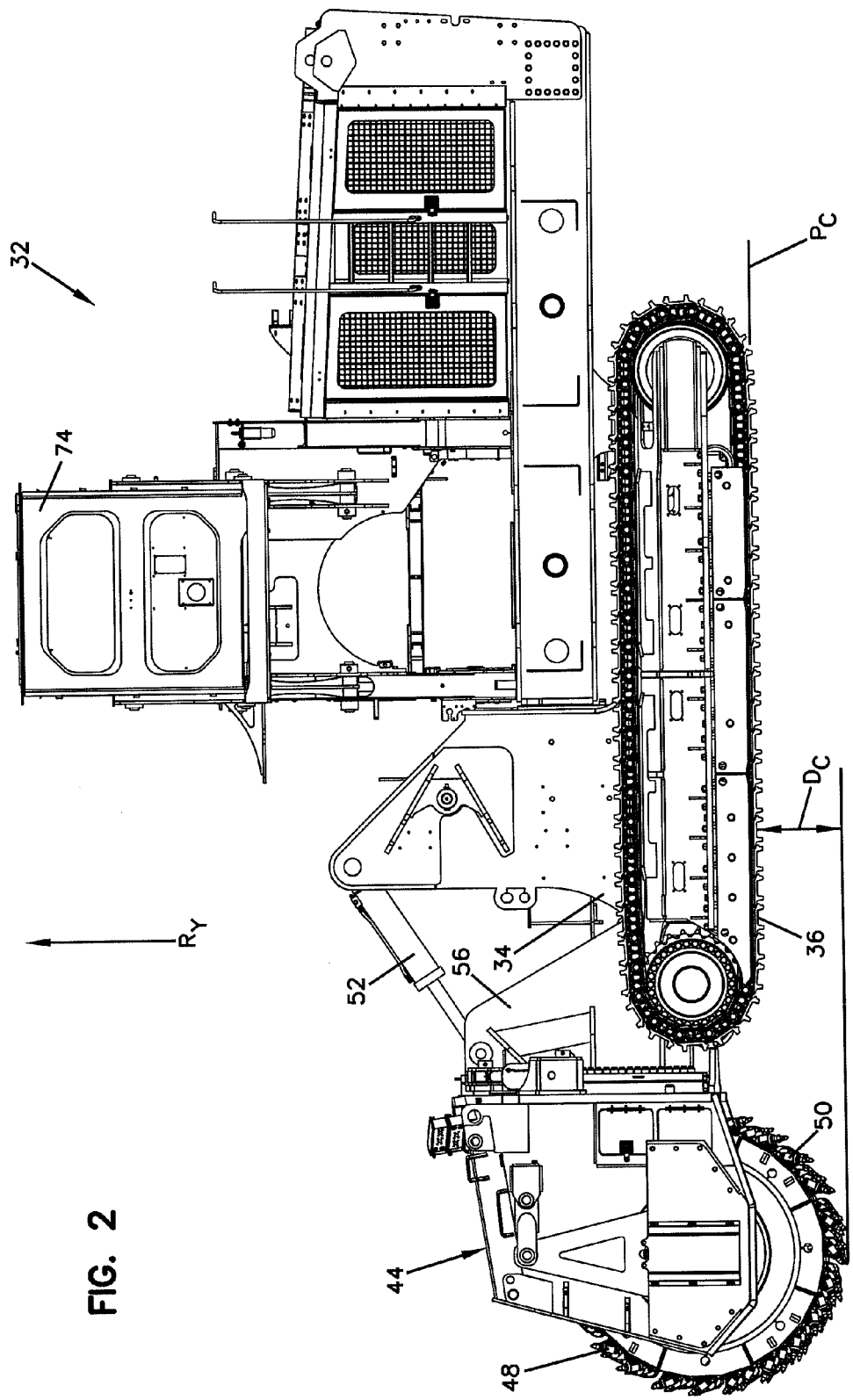
FIG. 2 is a side elevation view of the surface mining machine of FIG. 1 with the cab shown in an elevated position.
Figure 3:
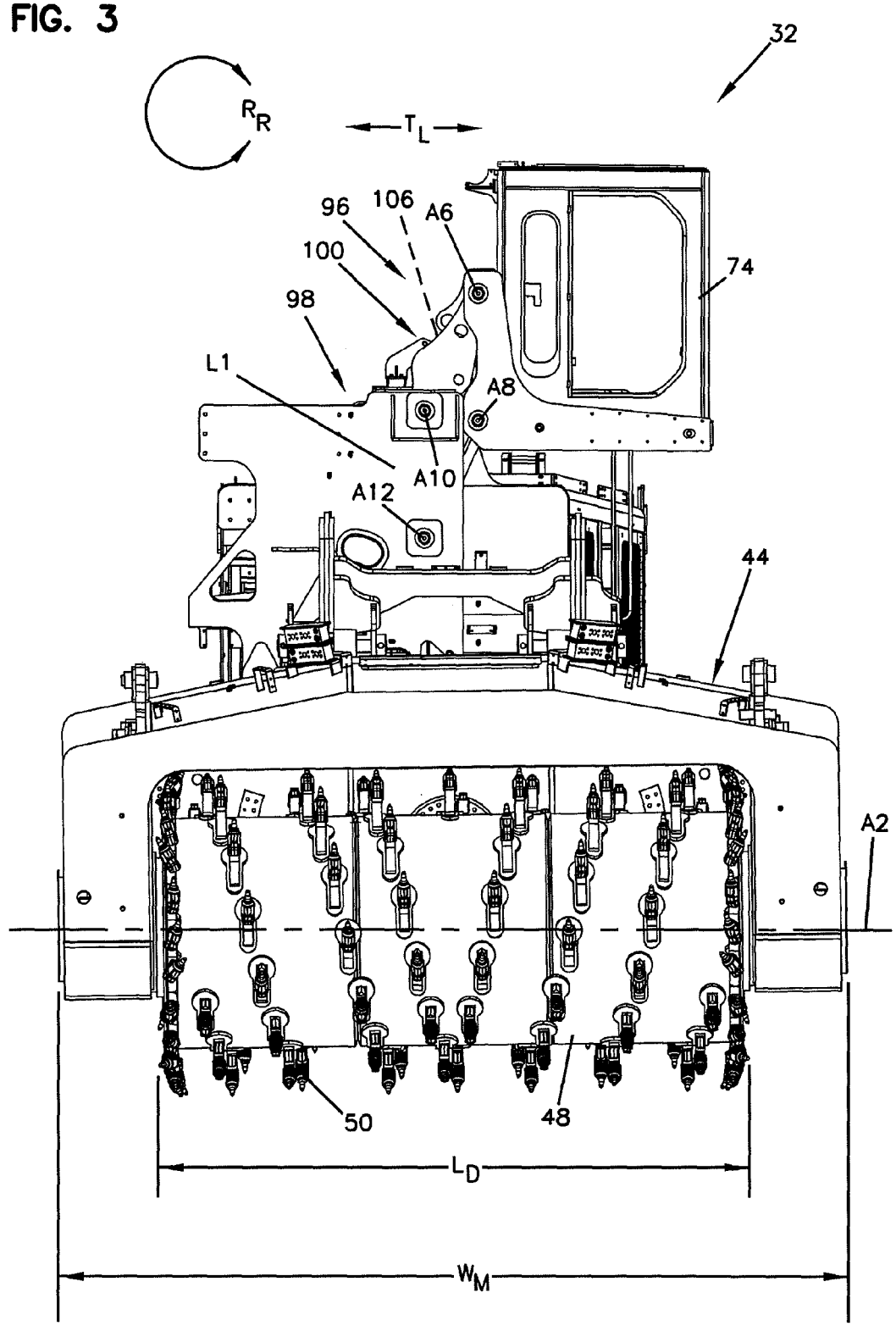
FIG. 3 is a rear elevation view of the surface mining machine of FIG. 1.
Figure 4:
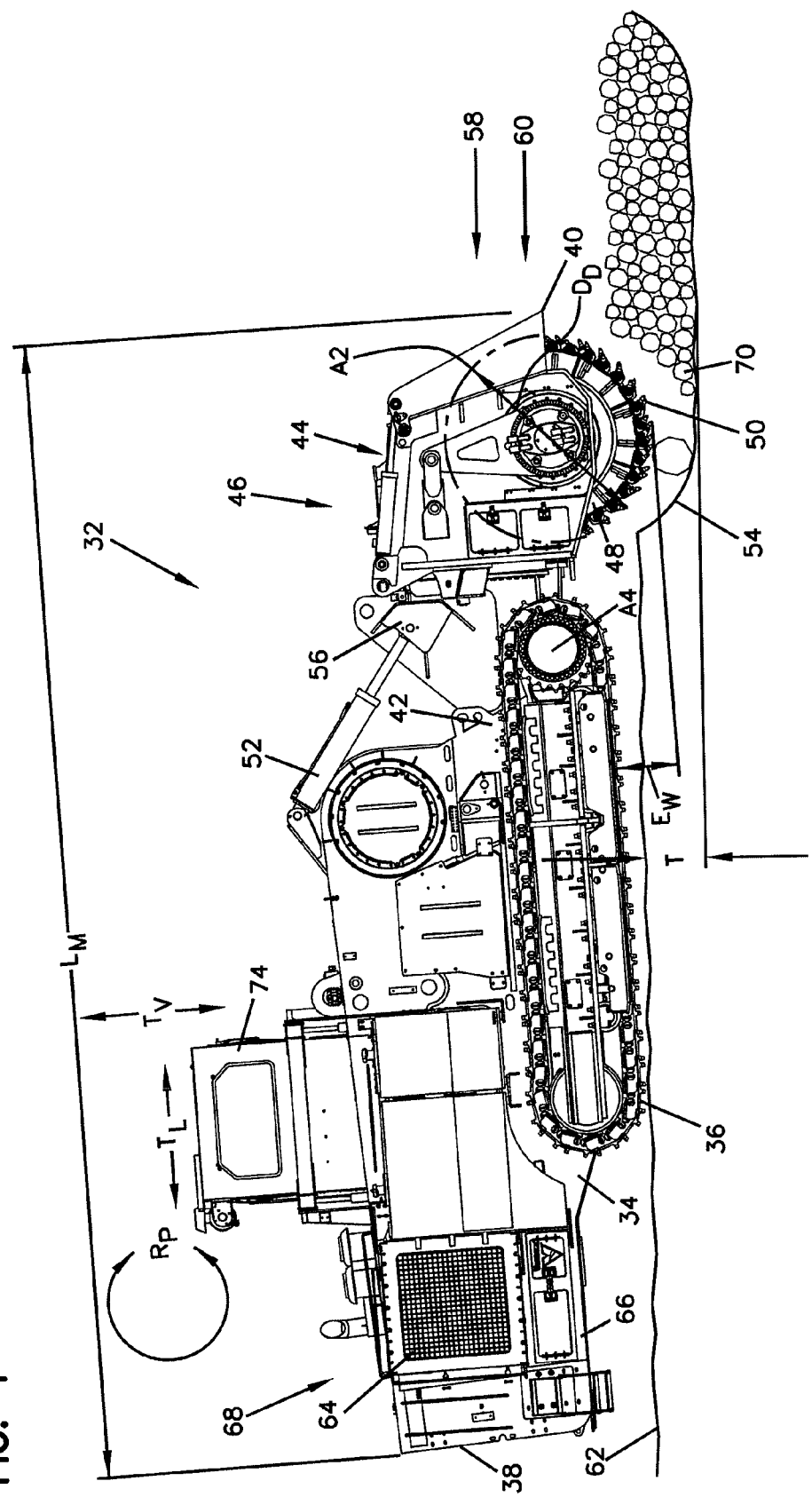
FIG. 4 is a side elevation view of the surface mining machine of FIG. 1 in the process of excavating a surface layer of rock.
Figure 5:
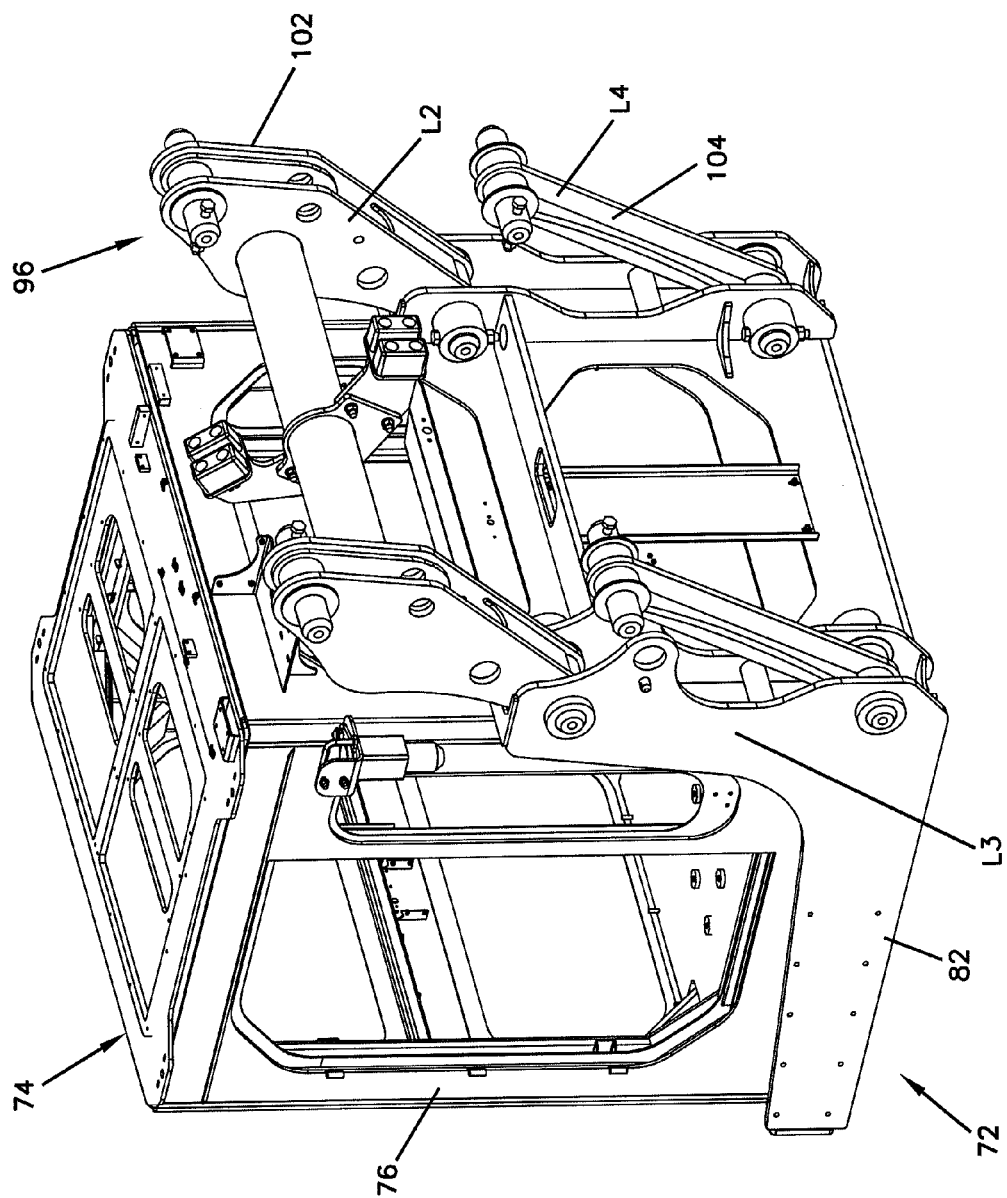
FIG. 5 is a perspective view of the cab of FIG. 1 mounted to a mounting platform of the cab suspension of FIG. 1.
Figure 6:
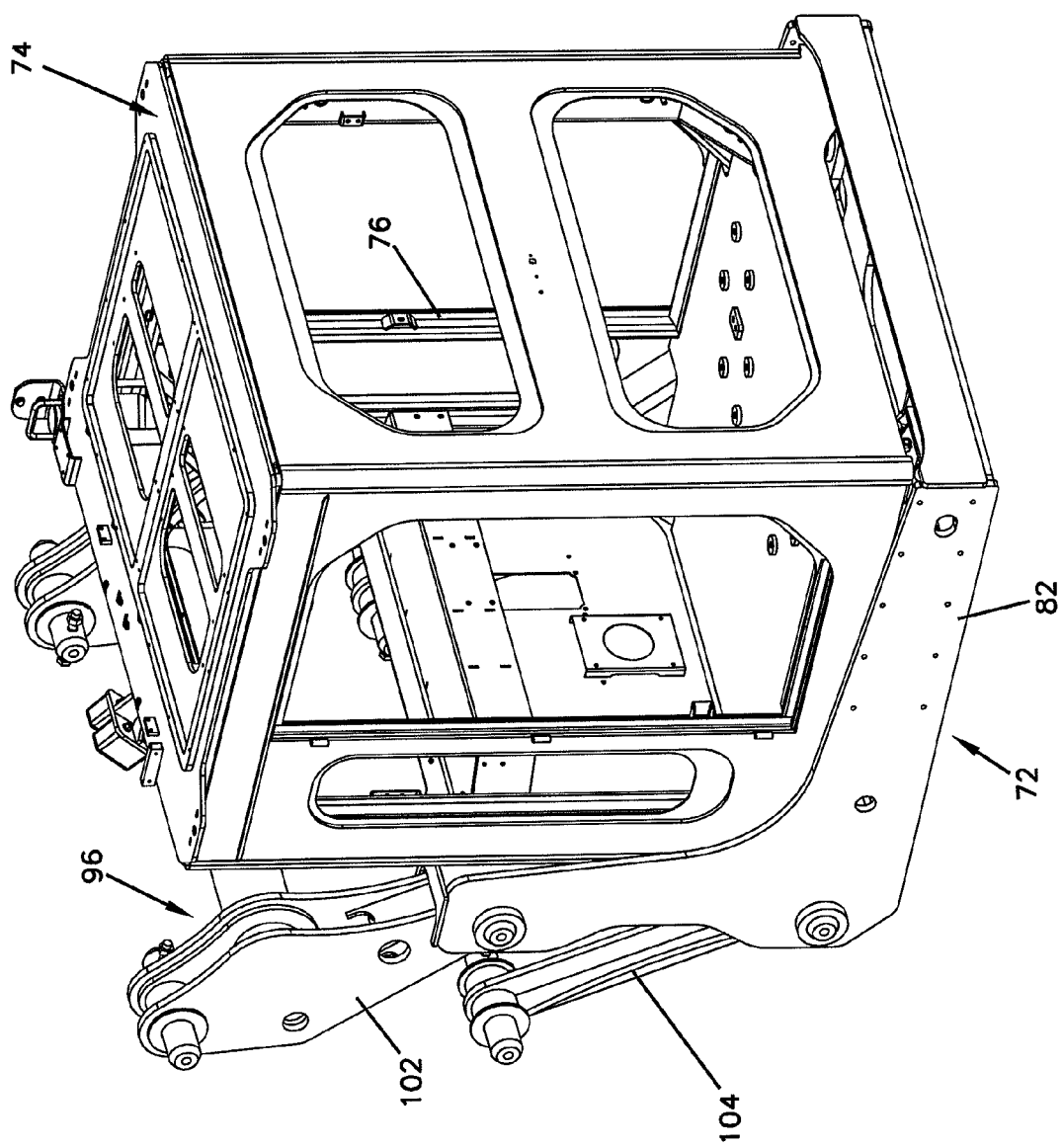
FIG. 6 is another perspective view of the cab of FIG. 1 mounted to the mounting platform of FIG. 5.
Figure 7:
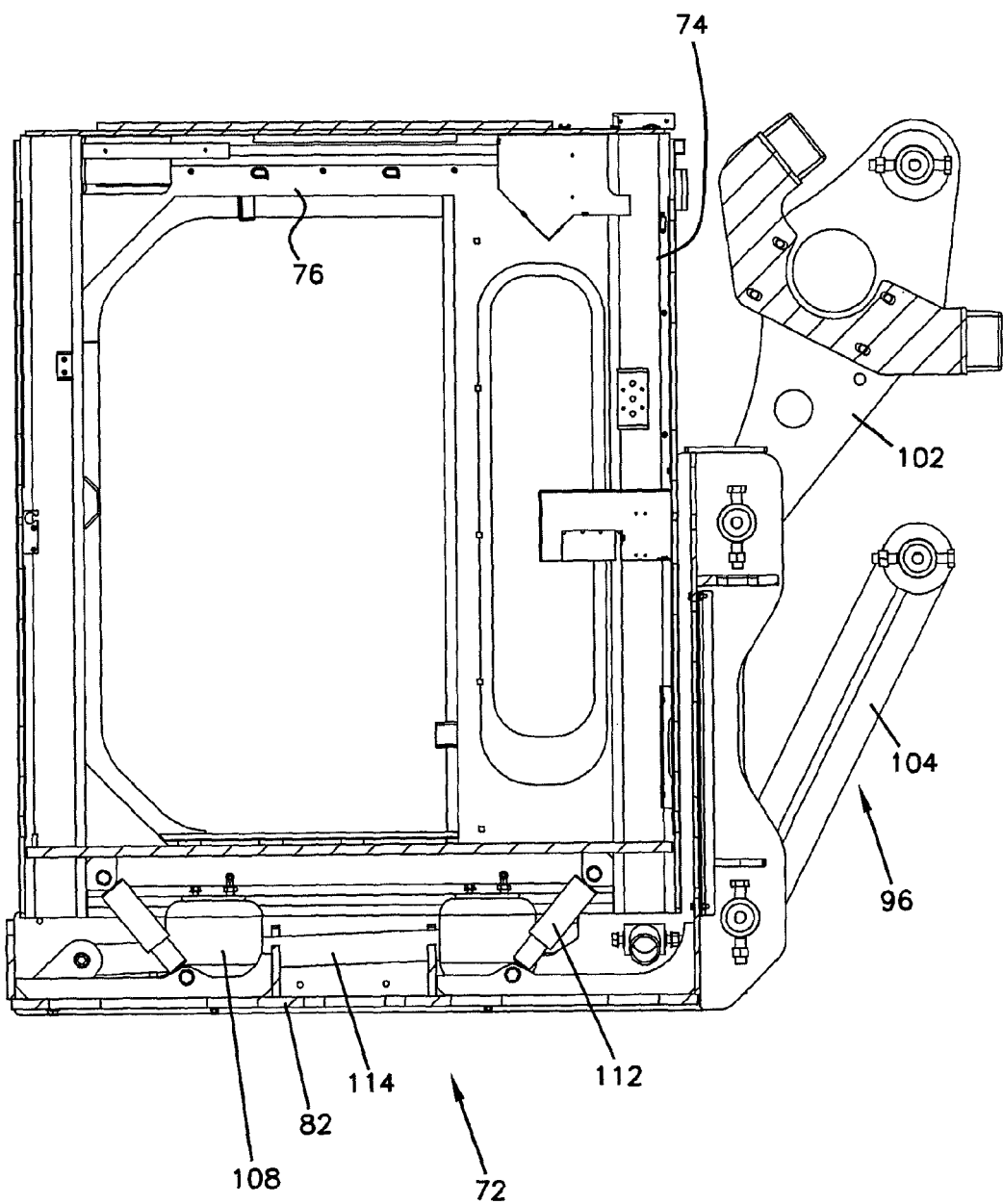
FIG. 7 is a cross-sectional front elevation view of the cab of FIG. 1 mounted to the mounting platform of FIG. 5.
Figure 8:
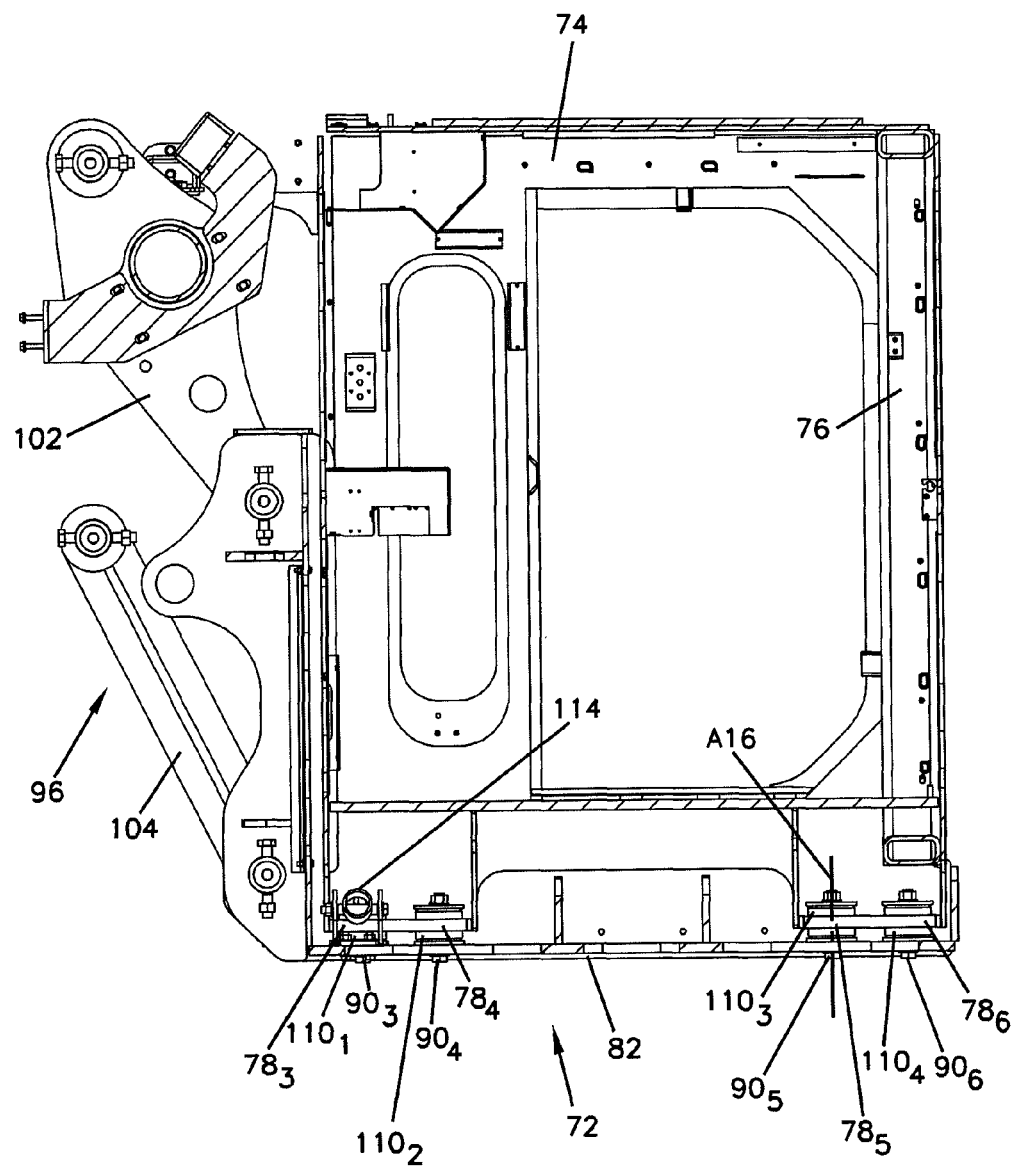
FIG. 8 is a cross-sectional rear elevation view of the cab of FIG. 1 mounted to the mounting platform of FIG. 5.
Figure 9:
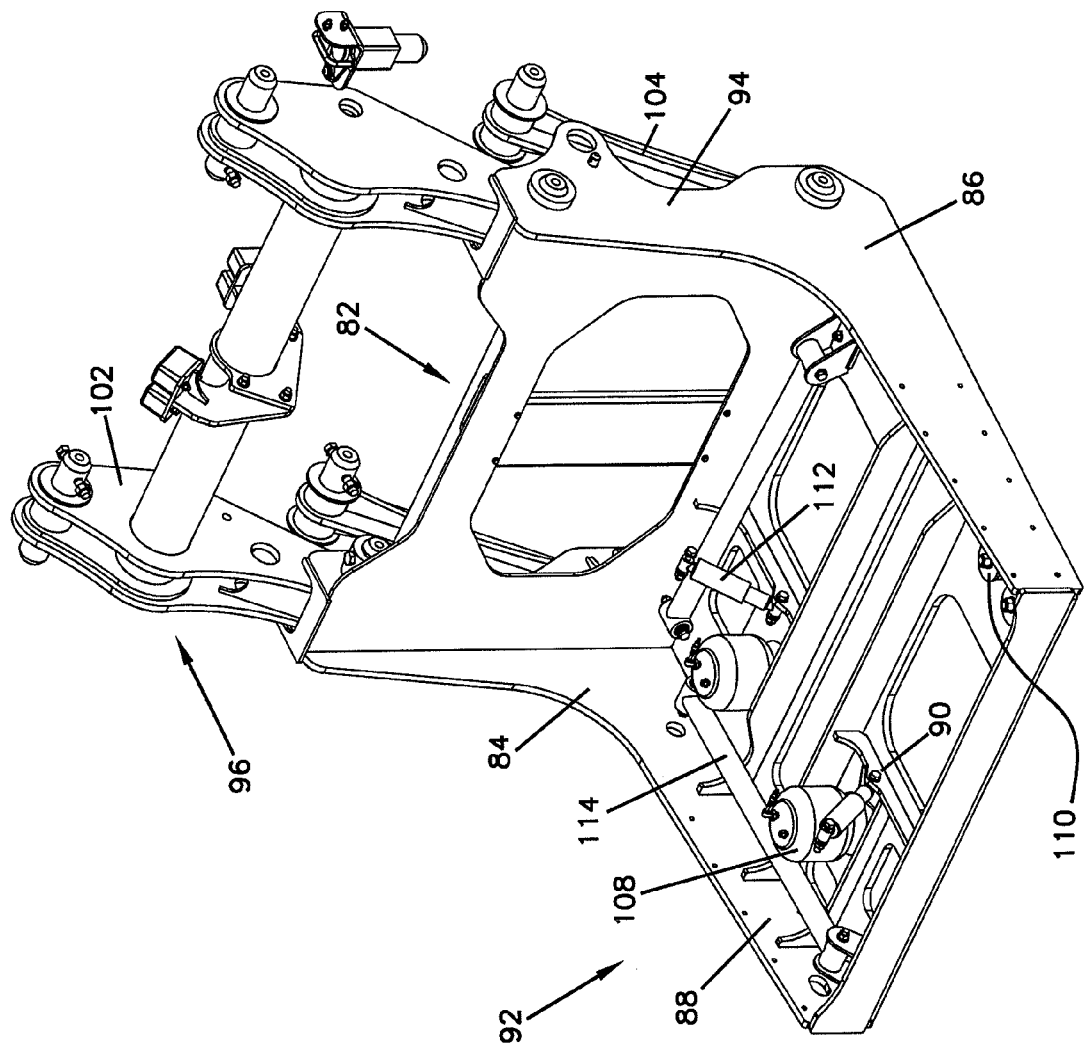
FIG. 9 is a perspective view of the mounting platform of FIG. 5.
Figure 10:
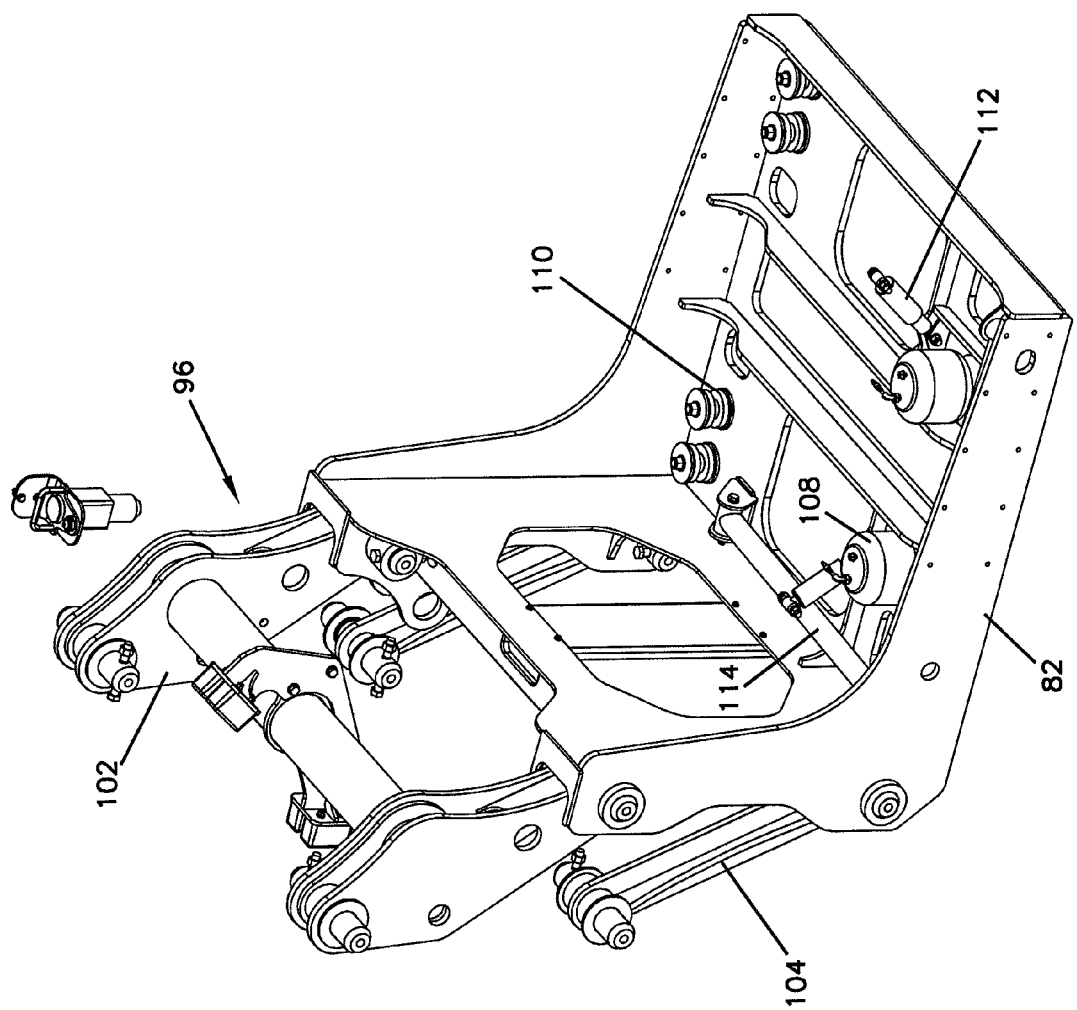
FIG. 10 is another perspective view of the mounting platform of FIG. 5.
Figure 11:
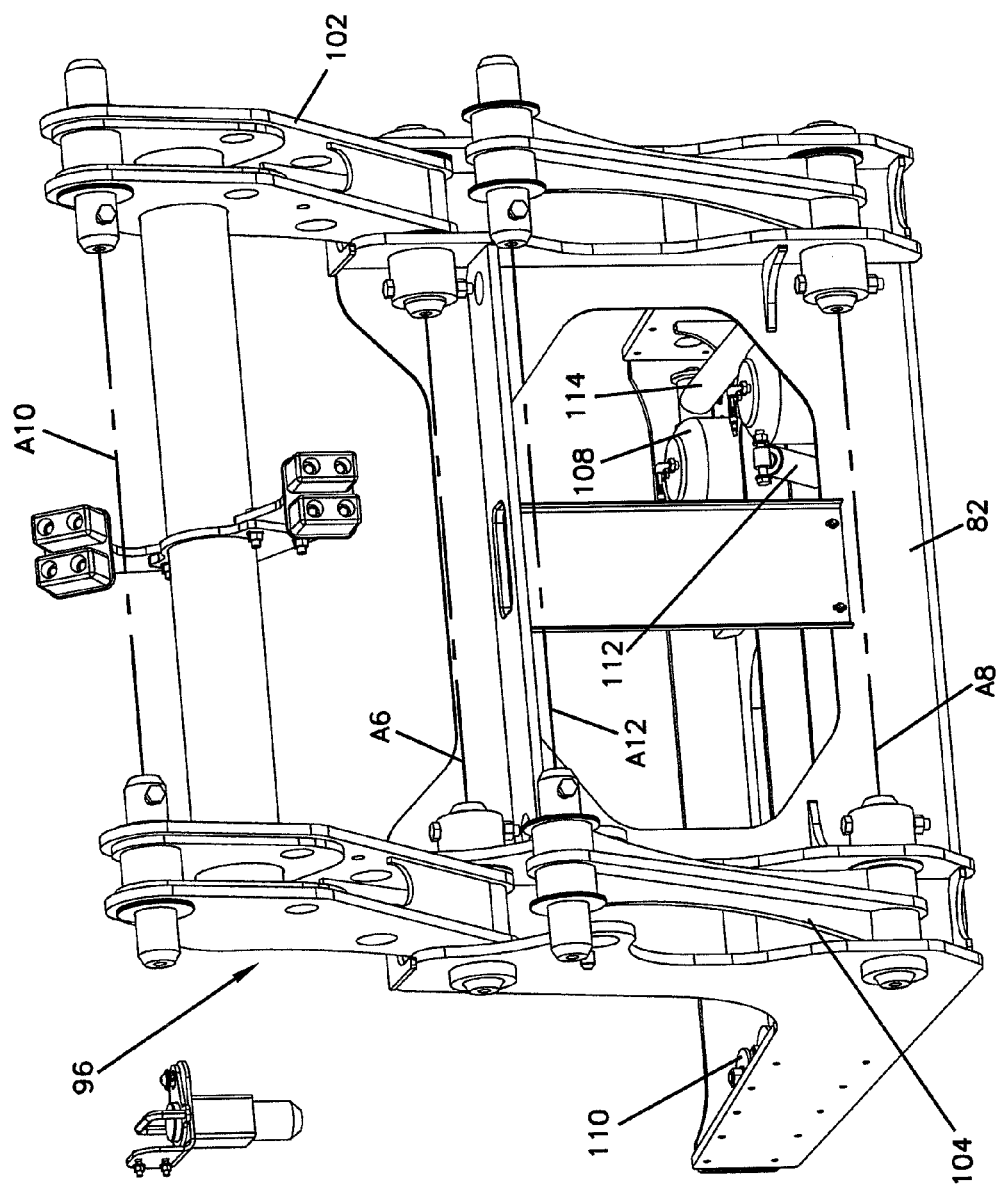
FIG. 11 is still another perspective view of the mounting platform of FIG. 5.
Figure 12:
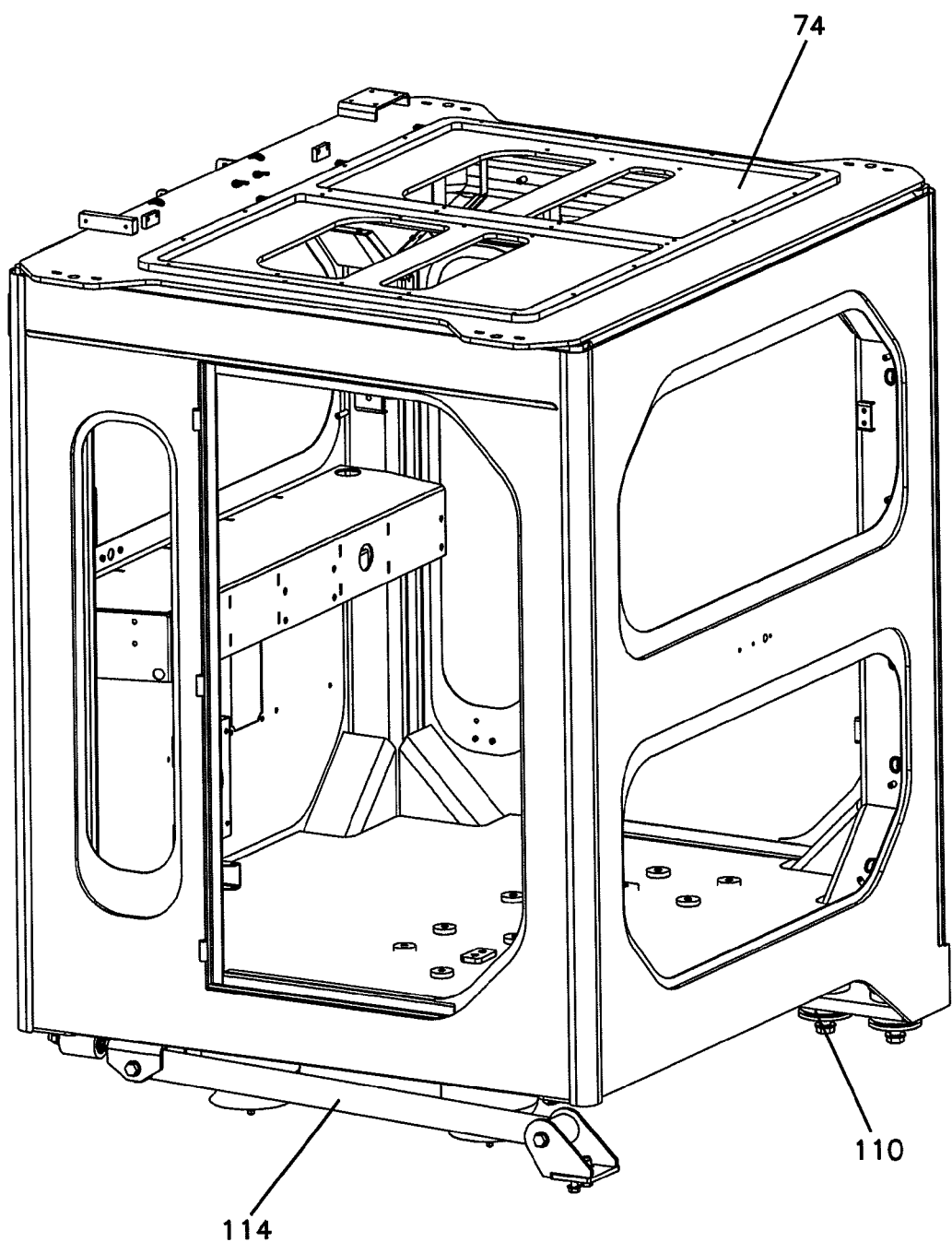
FIG. 12 is a perspective view of the cab of FIG. 1.
Figure 13:
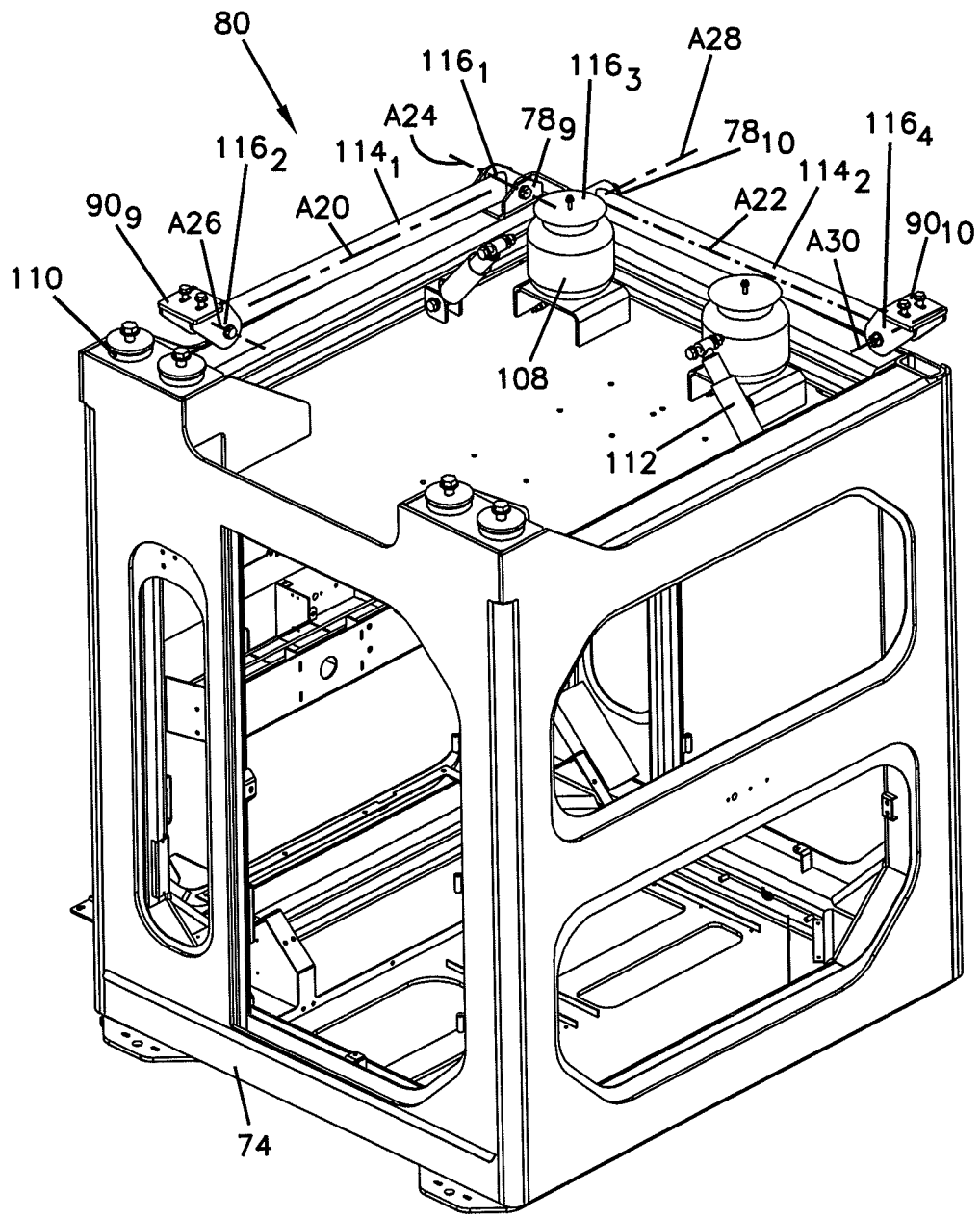
FIG. 13 is an inverted perspective view of the cab of FIG. 1.
Figure 14:
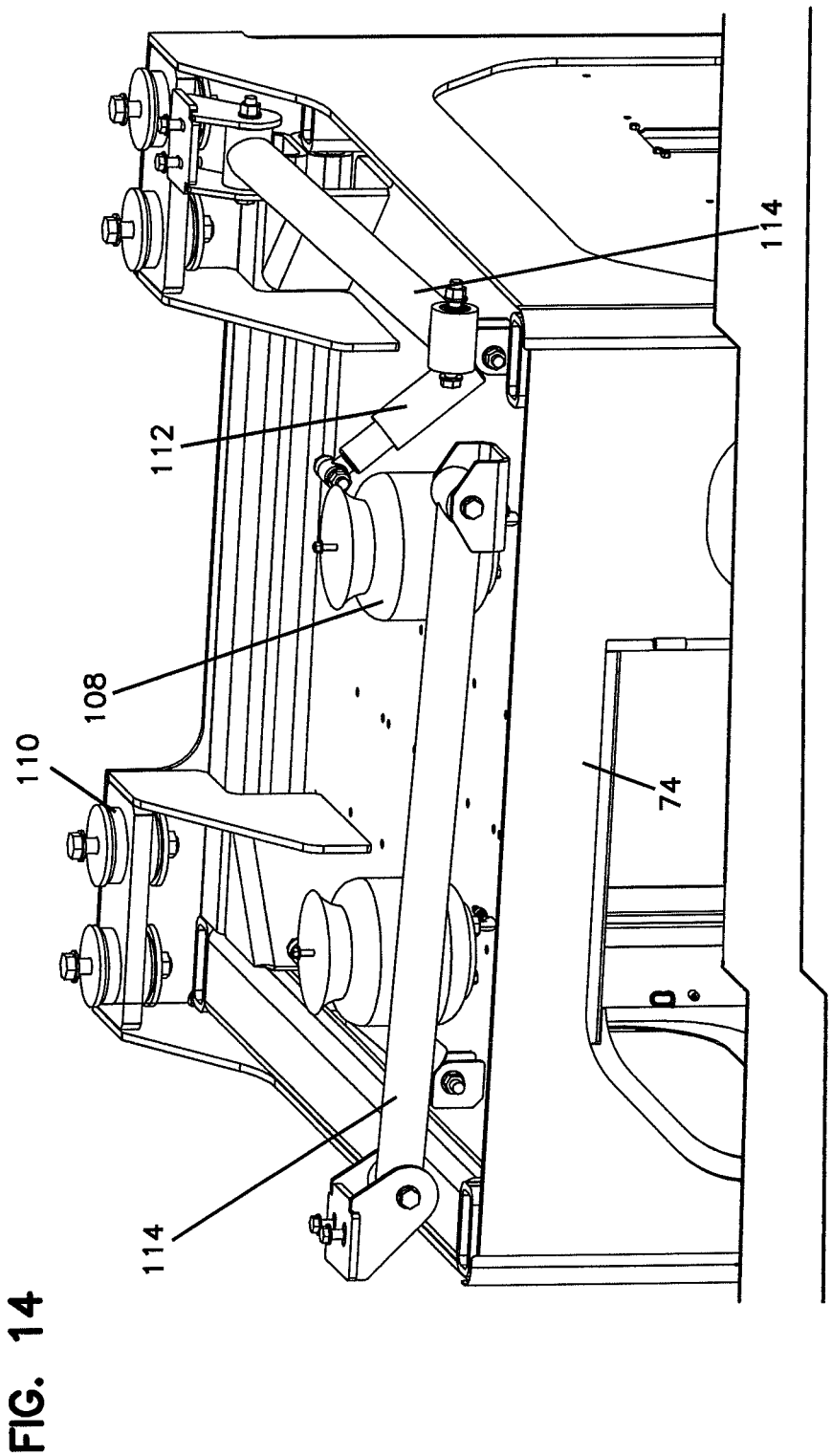
FIG. 14 is a partial inverted perspective view of the cab of FIG. 1.
Figure 15:
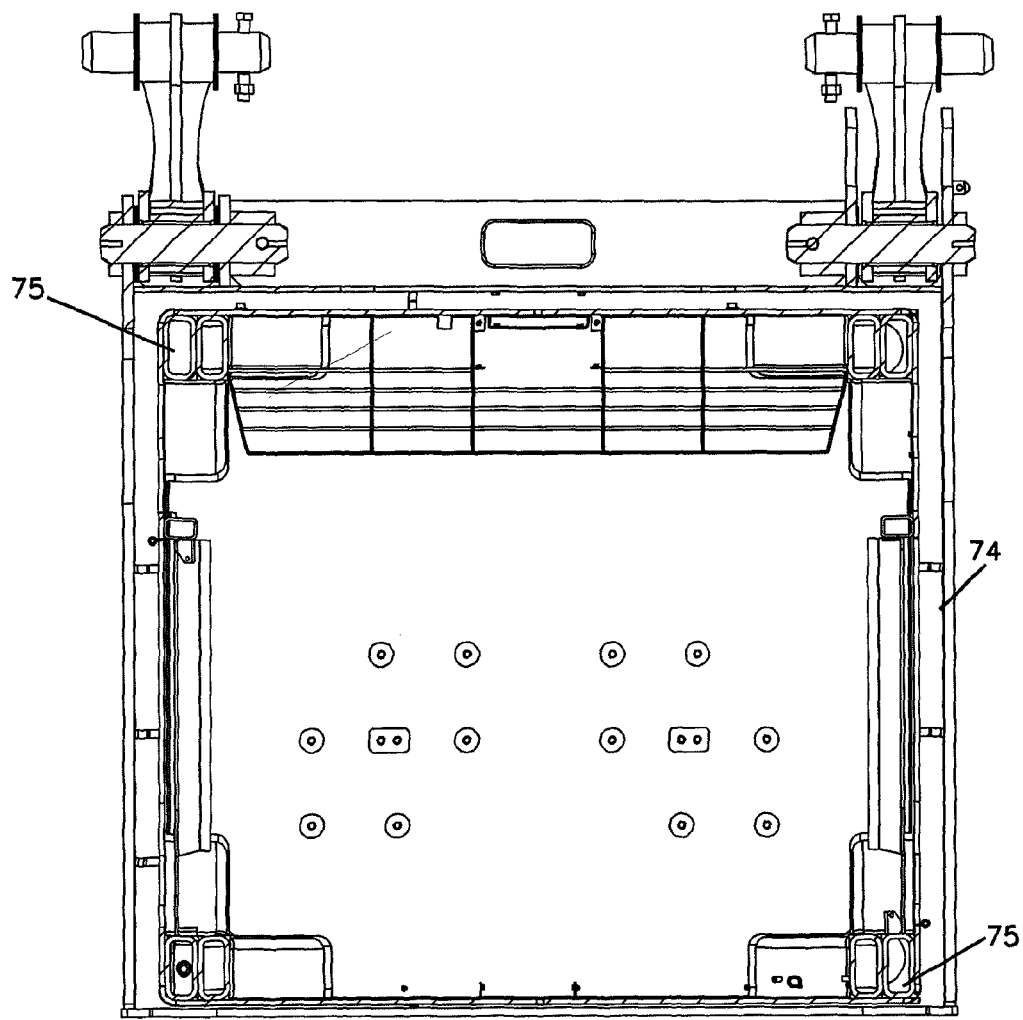
FIG. 15 is a cross-sectional view showing a double tube construction of the corner posts/supports of the cab.

In the depicted embodiment, the cab 74 is mounted to the main chassis 34 via a positioning system 96. The positioning system 96 may be used by the operator to position the cab 74 and thereby enhance access for entry/exit when in the lowered position while enhancing visibility of the operator with respect to the work attachment 44 and/or other portions of the surface mining machine 32 when in the raised position. The positioning system 96 can raise and lower the cab 74 relative to the main chassis 34 between the lowered position (see FIGS. 1 and 4) and the raised position (see FIGS. 2 and 3). In certain embodiments, the distance between the lowered and the raised positions is at least 2 feet or at least 3 feet or at least 6 feet. In certain embodiments, the floor of the cab is at least 10, 12, 14, or more feet above the ground level 62 when the cab 74 is in the raised position. The embodiment illustrated at FIGS. 2 and 3 is configured so that the floor of the cab 74 is 16 feet—4 inches above the ground level 62. In the lowered position, the floor of the cab 74 is located for appropriate entry/exit considerations. In certain embodiments, the floor of the cab 74 is at least 9 feet above the ground level 62 when the cab 74 is in the lowest position, and the cab 74 can be raised at least 5 feet above the lowest position by the positioning system 96.

As depicted, the positioning system 96 connects a mounting arrangement 98, included on the main chassis 34 of the surface mining machine 32, to the mounting platform 82 (see FIG. 3). As depicted, the positioning system 96 includes a four-bar linkage arrangement 100. In the depicted embodiment, the four-bar linkage arrangement 100 includes equal-length upper and lower arms 102, 104. The first axis A6 and the second axis A8 of the vertical leg 94 of the frame 84 of the mounting platform 82, described above, are the first axis A6 and the second axis A8 of the four-bar linkage arrangement 100. The mounting arrangement 98 of the main chassis 34 defines a third axis A10 and a fourth axis A12 of the four-bar linkage arrangement 100. In the depicted embodiment, the first and the second axes A6, A8 are spaced apart a distance equal to the spacing between the third and the fourth axes A10, A12. Thus, the four-bar linkage arrangement 100 includes a parallelogram linkage (see FIGS. 3 and 11).

The mounting arrangement 98, included on the main chassis 34, defines link L1 (i.e., the base) of the four-bar linkage arrangement 100. The upper arm 102 defines link L2 of the four-bar linkage arrangement 100. The mounting platform 82 defines link L3 of the four-bar linkage arrangement 100. And, the lower arm 104 defines link L4 of the four-bar linkage arrangement 100. The link L1 and the link L2 are rotatably connected along the third axis A10. The link L1 and the link L4 are rotatably connected along the fourth axis A12. The link L2 and the link L3 are rotatably connected along the first axis A6. And, the link L3 and the link L4 are rotatably connected along the second axis A8.

The positioning system 96 preferably includes an actuator 106 for controlling a configuration of the positioning system 96. In the depicted embodiment, the operator can control the configuration of the positioning system 96 by a control switch (not shown) on the machine control and information panel in the cab 74.

In the depicted embodiment, the cab 74 is attached to the mounting platform 82. In particular, various connecting elements join the attachment locations 78 of the cab 74 to the corresponding attachment locations 90 of the mounting platform 82. The various connecting elements are selected and arranged to isolate the cab 74 from shocks, vibrations, and noise, from sources mentioned above, yet retain structural integrity between the cab 74, the mounting platform 82, and the main chassis 34 of the surface mining machine 32.

In other embodiments, the cab 74 is attached directly to a series of attachment locations on the main chassis 34. Such embodiments may lack the cab positioning system 96.

The connecting elements and attachment locations 78, 90, both support and isolate the cab 74 in six degrees of freedom. In particular, gross translational movement is supported and isolated in the vertical, lateral, and axial directions $T_V$, $T_L$, $T_A$ of the surface mining machine 32 (see FIGS. 3 and 4). In addition, gross rotational movement is supported and isolated in the pitch, roll, and yaw rotational directions $R_P$, $R_R$, $R_Y$ of the surface mining machine 32 (see FIGS. 2-4). The various translational and rotational directions $T_V$, $T_L$, $T_A$, $R_P$, $R_R$, $R_Y$ have varying requirements for support and isolation.

Figure 16:
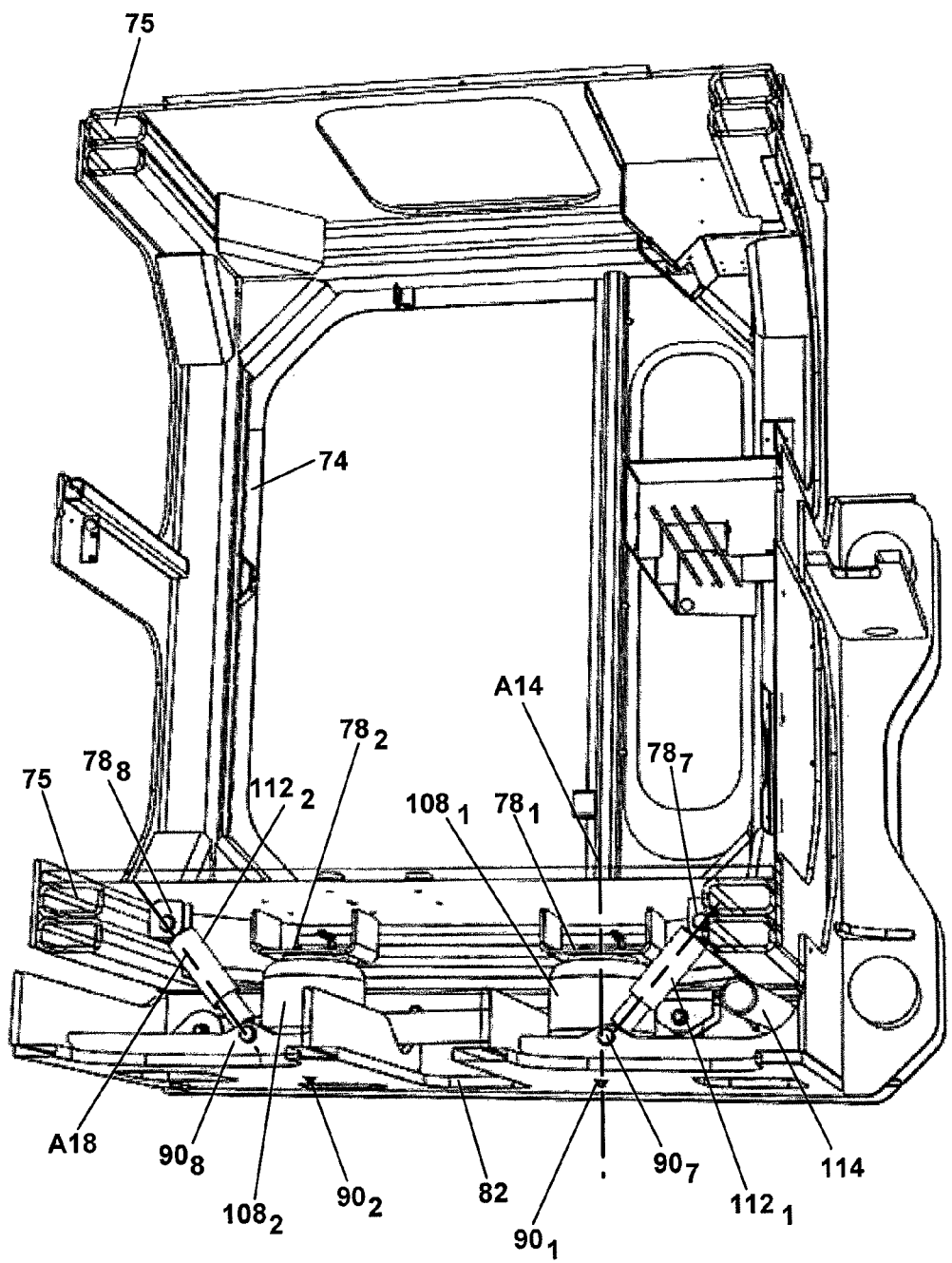
FIG. 16 is a cross-sectional view showing a double tube construction of the roof and floor supports of the cab.
Figure 17:
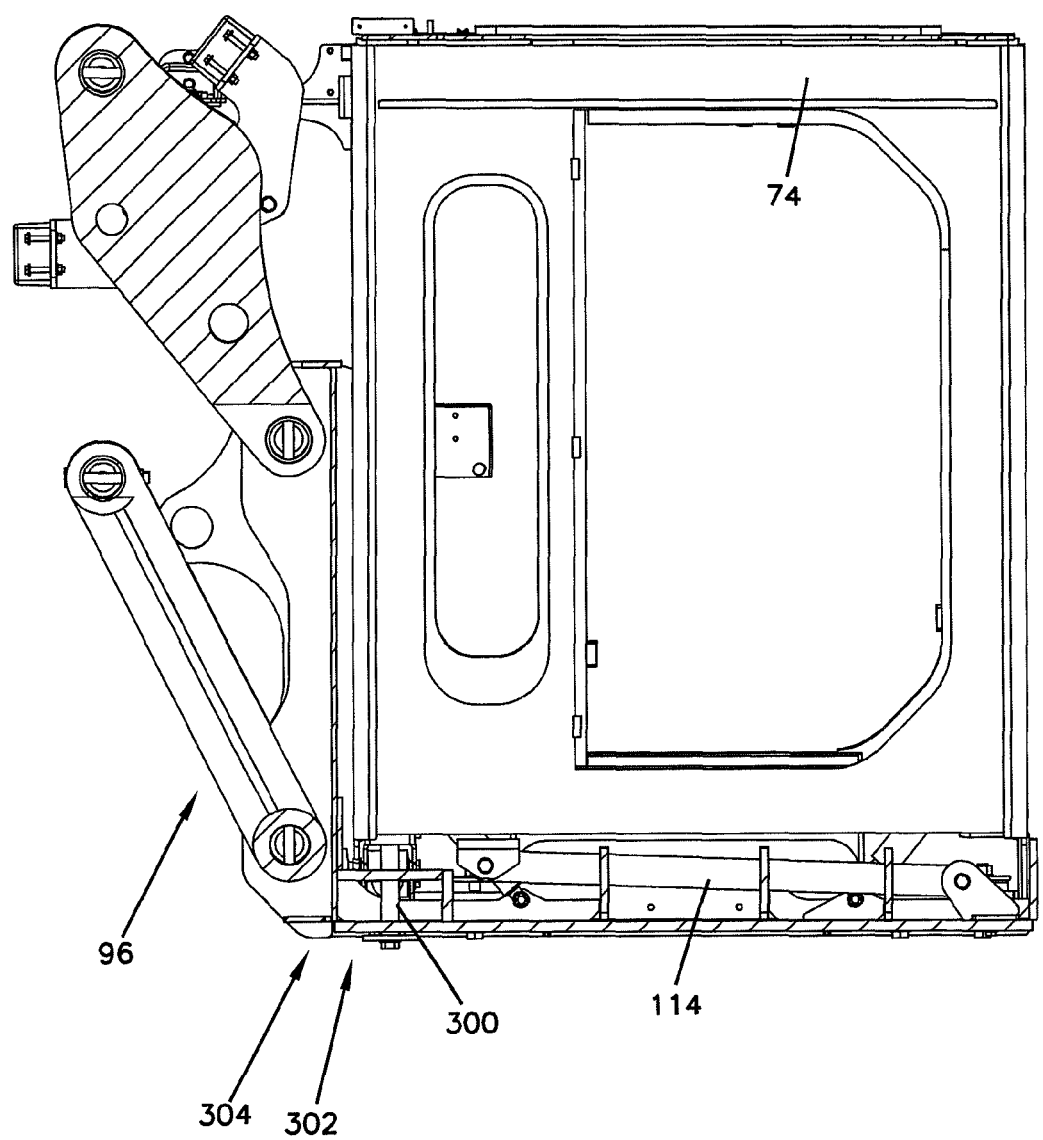
FIG. 17 is a cross-sectional view showing a vertical fail-safe connection for securing the cab to the platform.
Figure 18:
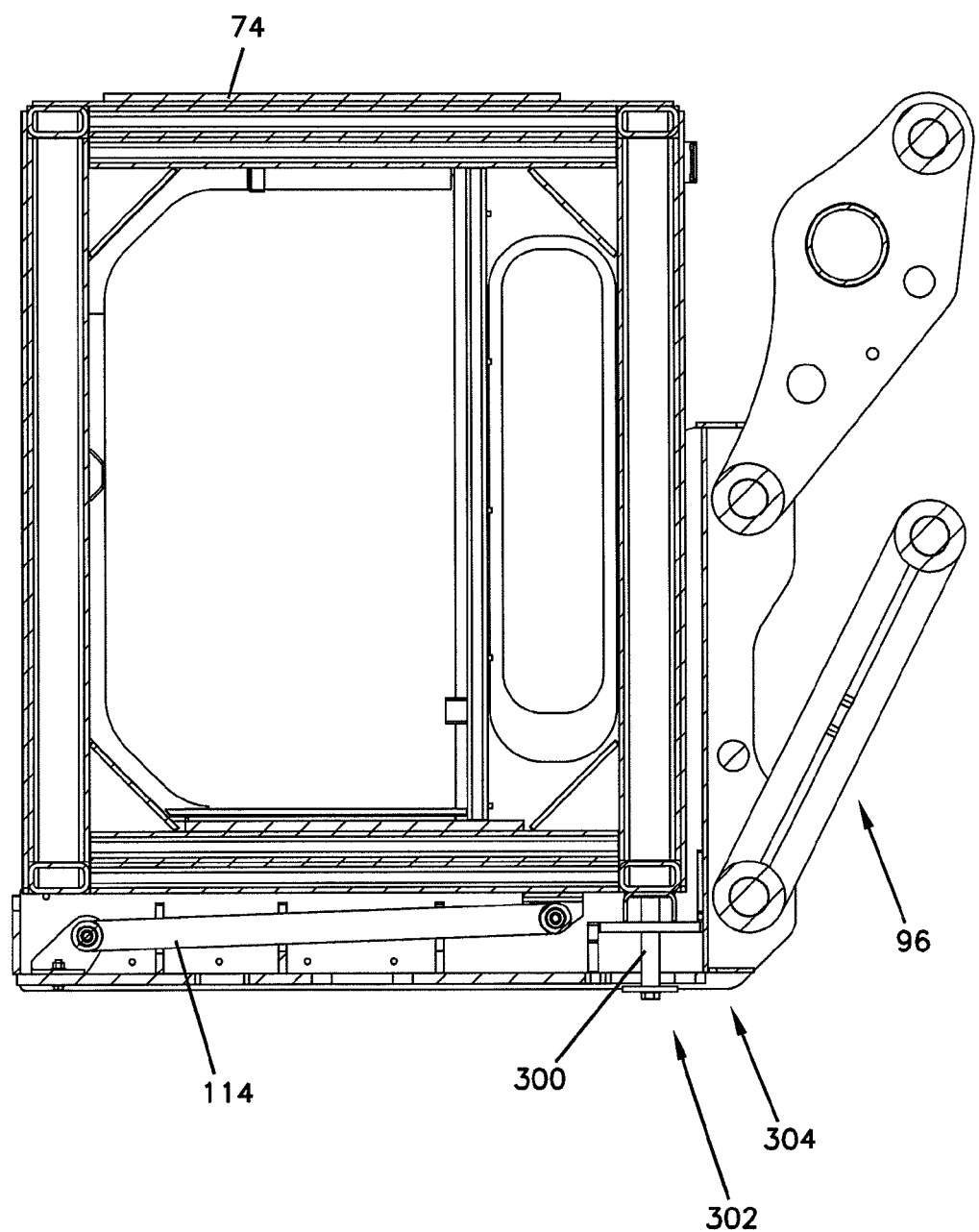
FIG. 18 is another cross-sectional view showing the vertical fail-safe connection for securing the cab to the platform.
Figure 19:
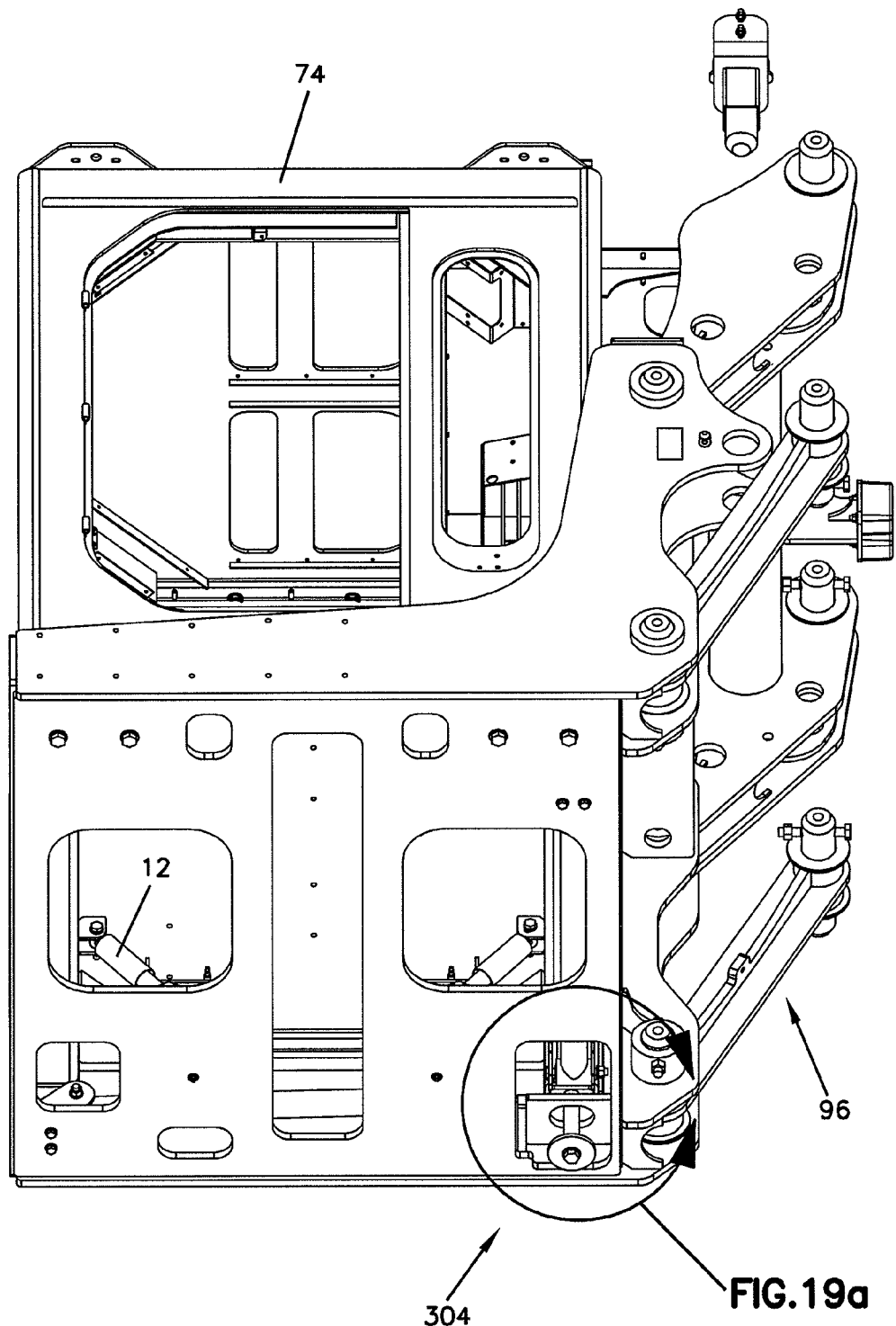
FIG. 19 is a perspective view showing the vertical fail-safe connection for securing the cab to the platform.
Figure 19A:
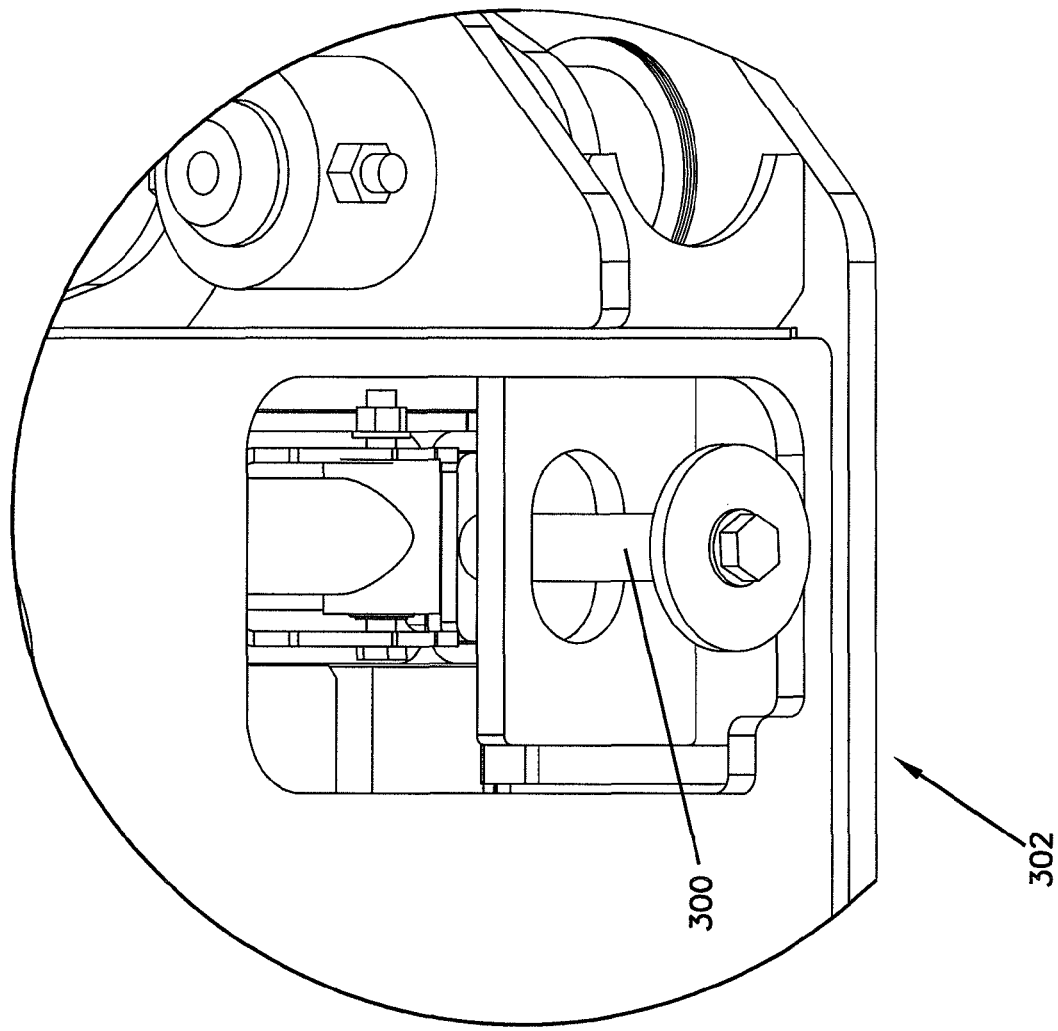
FIG. 19a is an enlarged view of a portion of FIG. 19.
Figure 20:
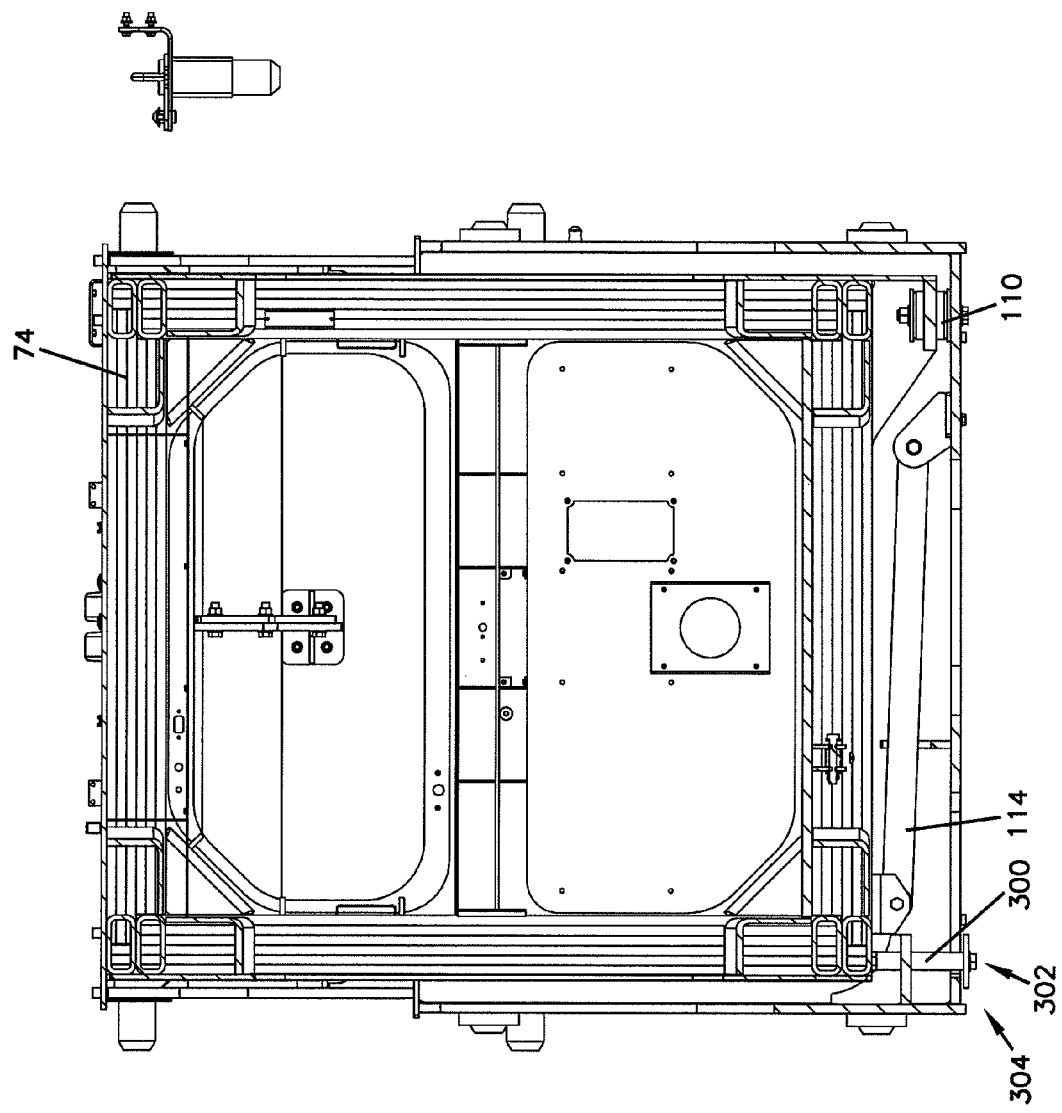
FIG. 20 is a further cross-sectional view showing the vertical fail-safe connection for securing the cab to the platform.

In the depicted embodiment, a pair of air springs 108 (i.e., air cushions, air dampeners, air bags, etc.) connects the cab 74 to the mounting platform 82. In particular, a first air spring $108_1$ is attached between an attachment location $78_1$ of the cab 74 and an attachment location $90_1$ of the mounting platform 82, and a second air spring $108_2$ is attached between an attachment location $78_2$ of the cab 74 and an attachment location $90_2$ of the mounting platform 82 (see FIG. 16). The air springs $108_1$, $108_2$ are orientated with their axis A14 aligned parallel to the vertical direction $T_V$ of the surface mining machine 32. The air springs $108_1$, $108_2$ may be an air spring 1R9-003 marketed by Goodyear Tire & Rubber Co. and/or Veyance Technologies, Inc, both of Akron, Ohio, USA. The air spring 1R9-003 has a static load range of 560 pounds to 3,700 pounds and a design height range of 8.0 inches to 12.0 inches. The air spring 1R9-003 may be charged at various levels of inflation pressure (e.g., 20 PSIG to 100 PSIG). The air spring 1R9-003 exhibits non-linear load vs. deflection characteristics at constant charge pressure. The load vs. deflection characteristics are dependent on the inflation (i.e., charge) pressure. The air spring 1R9-003 and supported mass exhibit a range of natural frequencies (e.g., 1.10 Hz to 2.02 Hz) that depend on the weight of the mass, the inflation pressure, and the design height. The air spring 1R9-003 provides support along the axis A14. The air spring 1R9-003 does not provide significant lateral support (i.e., support perpendicular to the axis A14).

The air springs $108_1$, $108_2$ provide support and isolation to the cab 74 in the vertical direction $T_V$ of the surface mining machine 32 and therefore support a portion of the weight of the cab 74. As the air springs $108_1$, $108_2$ are spaced from each other along the lateral direction $T_L$ of the surface mining machine 32, they also provide support and isolation to the cab about the rolling direction $R_R$ of the surface mining machine 32. In certain embodiments, the suspension is designed to allow for a vertical displacement of at least plus or minus 0.5 inch from a neutral position, or at least plus or minus 1.0 inch from the neutral position, or at least plus or minus 1.5 inches from the neutral position.

In the depicted embodiment, a set of four elastomeric dampers 110 connects the cab 74 to the mounting platform 82. In particular, a first elastomeric damper $110_1$ is attached between an attachment location $78_3$ of the cab 74 and an attachment location $90_3$ of the mounting platform 82, a second elastomeric damper $110_2$ is attached between an attachment location $78_4$ of the cab 74 and an attachment location $90_4$ of the mounting platform 82, a third elastomeric damper $110_3$ is attached between an attachment location $78_5$ of the cab 74 and an attachment location $90_5$ of the mounting platform 82, and a fourth elastomeric damper $110_4$ is attached between an attachment location $78_6$ of the cab 74 and an attachment location $90_6$ of the mounting platform 82 (see FIG. 8). The elastomeric dampers $110_{1-4}$ are orientated with their axis A16 aligned parallel to the vertical direction $T_V$ of the surface mining machine 32. The elastomeric dampers $110_{1-4}$ provide support along their axis A16 and also provide support perpendicular to the axis A16 (i.e., lateral support).

The elastomeric dampeners 110 can have natural frequencies substantially higher than the natural frequencies of the air springs 108. In one embodiment, the natural frequency of each air spring 108 is less than or equal to 5 Hertz and the natural frequency of each elastomeric dampeners 110 is greater than or equal to 8 Hertz. In another embodiment, the natural frequency of each air spring 108 is less than or equal to 3 Hertz and the natural frequency of each elastomeric dampeners 110 is greater than or equal to 10 Hertz. In still another embodiment, the natural frequency of each elastomeric dampener 110 is at least 2, 3, 4 or 5 times as large as the natural frequency of each air spring 108. The elastomeric dampeners 110 allow for substantially less vertical movement of the cab 74 as compared to the air springs 108. In one embodiment, the air springs 108 allow for at least 5 times or at least 10 times as much vertical movement as compared to the vertical movement allowed by the elastomeric dampeners 110.

The elastomeric dampers $110_{1-4}$ provide support and isolation to the cab 74 in the vertical direction $T_V$ of the surface mining machine 32 by virtue of their axial support along the axis A16 and therefore support a portion of the weight of the cab 74. As the elastomeric dampers $110_{1-4}$ are spaced along the lateral direction $T_L$ of the surface mining machine 32, they also provide support and isolation to the cab 74 about the rolling direction $R_R$ of the surface mining machine 32 by virtue of their axial support along the axis A16. The elastomeric dampers $110_{1-4}$ provide support and isolation to the cab 74 in the axial direction $T_A$ of the surface mining machine 32 by virtue of their support lateral to the axis A16. The elastomeric dampers $110_{1-4}$ provide support and isolation to the cab 74 in the lateral direction $T_L$ of the surface mining machine 32 by virtue of their support lateral to the axis A16. As the elastomeric dampers $110_{1-4}$ are spaced along the lateral direction $T_L$ of the surface mining machine 32, they also provide support and isolation to the cab 74 in the yawing $R_Y$ direction of the surface mining machine 32 by virtue of their support lateral to the axis A16.

As the air springs $108_1$, $108_2$ are spaced from the elastomeric dampers $110_{1-4}$ along the axial direction $T_A$ of the surface mining machine 32 and both the air springs $108_1$, $108_2$ and the elastomeric dampers $110_{1-4}$ provide support in the vertical direction $T_V$ of the surface mining machine 32, the air springs $108_1$, $108_2$ combined with the elastomeric dampers $110_{1-4}$ provide support and isolation to the cab 74 about the pitching direction $R_P$ of the surface mining machine 32.

In the depicted embodiment, the air springs $108_1$, $108_2$ are positioned adjacent the end of the cab 74 nearest to the tools 50, and the elastomeric dampers $110_{1-4}$ are positioned adjacent the end of the cab 74 nearest to the engine 64. This configuration allows the air springs $108_1$, $108_2$ to isolate the larger shocks and low frequency-high amplitude vibrations produced and transmitted by the tools 50. This configuration also allows the elastomeric dampers $110_{1-4}$ to isolate the high frequency-low amplitude vibrations produced and transmitted by the engine 64. The suspension is designed to allow substantially more vertical displacement at the air springs 108 as compared to at the dampeners 110. When larger vertical displacements of rear end of the cab 74 (i.e., the end of the cab closer to the drum 48) are accommodated by the air springs 108, the front end of the cab 74 pivots about the dampeners 110 such that the dampeners 110 function to form a hinge line/location of the suspension system 72.

In the depicted embodiment, a pair of dampers 112 (i.e., shock absorbers) connects the cab 74 to the mounting platform 82. The dampers 112 are depicted as including piston rods that slide axially within cylinders. The term damper is intended to be a generic term, that also includes devices called gas shocks and hydraulic shocks, describing any device that functions as a dashpot. In particular, a first damper $112_1$ is attached between an attachment location $78_7$ of the cab 74 and an attachment location $90_7$ of the mounting platform 82, and a damper $112_2$ is attached between an attachment location $78_8$ of the cab 74 and an attachment location $90_8$ of the mounting platform 82 (see FIG. 16). The dampers $112_1$, $112_2$ are orientated with their axes A18 angled with respect to each other. The axes A18 form a vertical plane that is perpendicular to the axial direction $T_A$ of the surface mining machine 32. The dampers 112 do not provide sustained support for the cab 74 in normal use. Instead, they resist vertical movement of the cab and absorb and dissipate vibrational energy thereby preventing uncontrolled or prolonged oscillation of the cab about the air springs 108 after a shock load has been applied to the cab. The dampers 112 may be a gas shock model 89436 marketed by Gabriel, of Troy, Mich., USA or the equivalent, with characteristics including a rebound force of 998 lb, or within a range of 800 lb. to 1000 lb. and a compression force of 217 lbs, or within a range of 150 lbs to 300 lbs. Since the dampers are oriented with their axes angled relative to each other, they tend to reduce both horizontal and vertical oscillations of the cab, in addition to associated angular oscillations.

Figure 21:
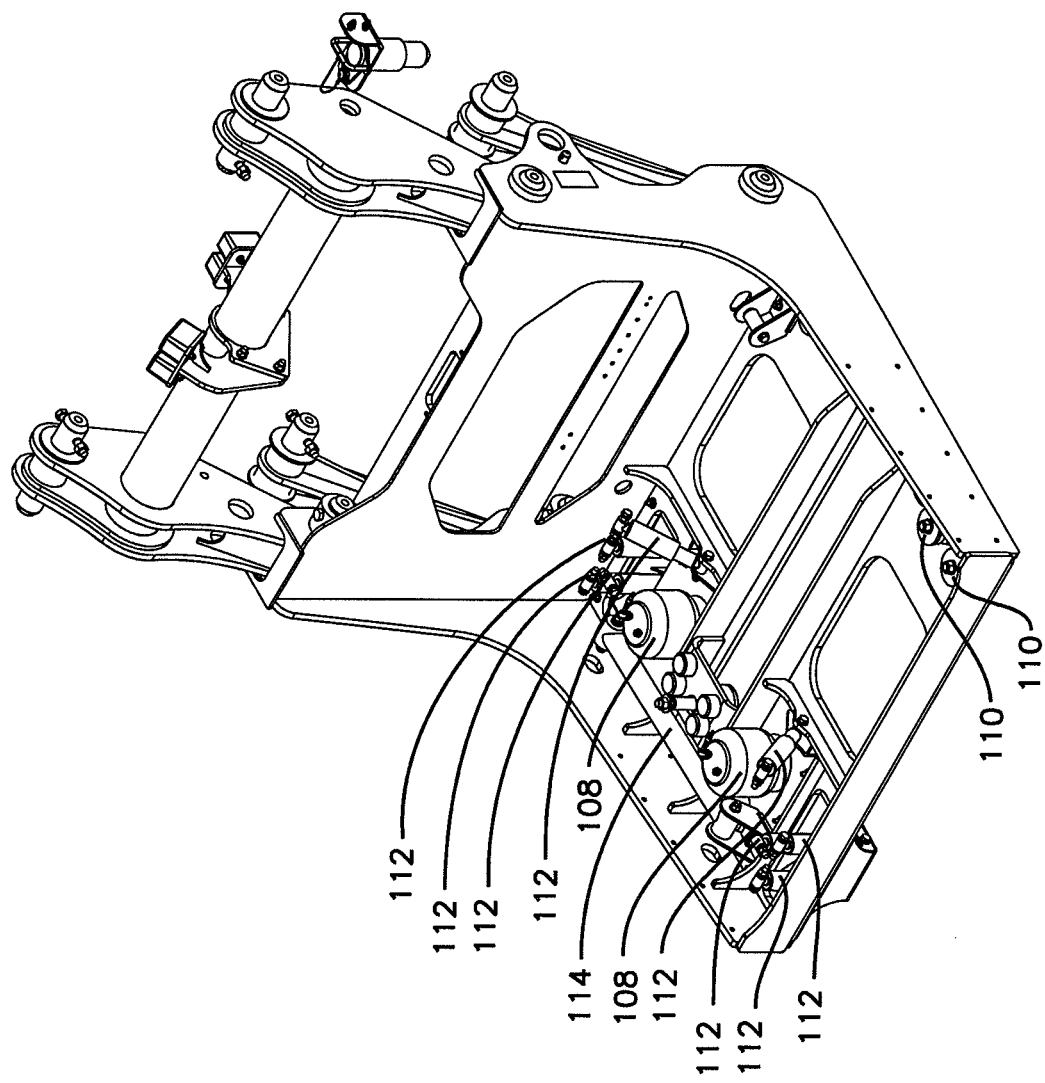
FIG. 21 shows another suspension arrangement in accordance with the principles of the present disclosure.
Figure 22:
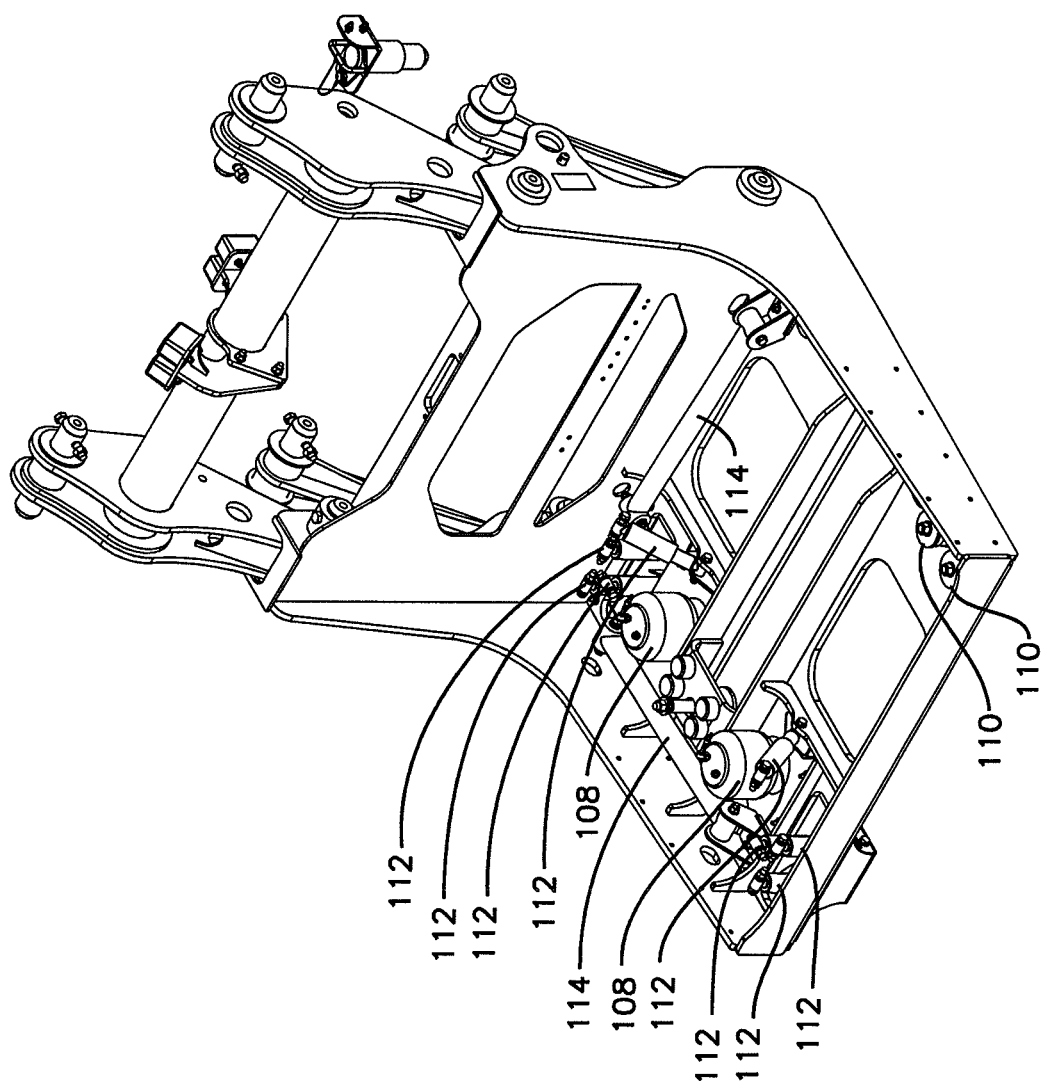
FIG. 22 shows a further suspension arrangement in accordance with the principles of the present disclosure.

Alternative embodiments are depicted in FIGS. 21 and 22, wherein additional dampers have been found to improve the ride quality. In these two figures three additional dampers or dashpots 112 have been added adjacent each air spring. The suspension system includes a first set of dampers 112 corresponding to one of the air springs 108, and a second set of dampers 112 corresponding to the other air spring 108. Each set of dampers is shown including one damper 112 angled relative to verticals and three dampers that are vertically aligned. In other embodiments, each set of dampers can include more or fewer than four dampers. The cumulative damping effect of each set of dampers 112 will be:
  Resistance to upward movement of the cab, the rebound force of the damper, of greater than 3500 lbs or approximately 4000 lbs, and
  Resistance to downward movement of the cab, the compression force of the damper, of greater than 800 lbs or approximately 870 lbs.
With this configuration the total rebound force of each set of dampers is slightly higher than the force exerted by the airspring 108 corresponding to each set, while the total compression force of each set of dampers is at least 20 percent or approximately 25% of the force exerted by the airspring 108 corresponding to each set.

In the depicted embodiment, a pair of links 114 (e.g., panhard rods, etc.) connects the cab 74 to the mounting platform 82. In particular, a first link $114_1$ is attached between an attachment location $78_9$ of the cab 74 and an attachment location $90_9$ of the mounting platform 82, and a second link $114_2$ is attached between an attachment location $78_{10}$ of the cab 74 and an attachment location $90_{10}$ of the mounting platform 82. The first link $114_1$ is orientated with its axis A20 generally aligned parallel to the axial direction $T_A$ of the surface mining machine 32, and the second link $114_2$ is orientated with its axis A22 generally aligned parallel to the lateral direction $T_L$ of the surface mining machine 32 (see FIG. 13).

The attachment locations $78_9$, $78_{10}$, $90_9$, $90_{10}$ may include corresponding cylindrical joints, spherical joints, and or elastomeric joints. As depicted, the attachment locations $78_9$, $78_{10}$, $90_9$, $90_{10}$ correspond with joints 116 idealized as cylindrical joints 116. However, these joints 116 may allow rotational movement in directions other than about the ideal axis of the cylindrical joint 116 (e.g., if the joints 116 are elastomeric joints). These joints 116 may also allow translational movements (e.g., if the joints 116 are elastomeric joints). The attachment location $78_9$ corresponds with a joint $116_1$, and the attachment location $90_9$ corresponds with a joint $116_2$. The joints $116_1$ and $116_2$ define axes A24 and A26 respectively. The axes A24, A26 are generally aligned parallel with the lateral direction $T_L$ of the surface mining machine 32. The axes A24, A26 are generally aligned perpendicular to the axis A20 of the first link $114_1$. The attachment location $78_{10}$ corresponds with a joint $116_3$, and the attachment location $90_{10}$ corresponds with a joint $116_4$. The joints $116_3$ and $116_4$ define axes A28 and A30 respectively. The axes A28, A30 are generally aligned parallel with the axial direction $T_A$ of the surface mining machine 32. The axes A28, A30 are generally aligned perpendicular to the axis A22 of the second link $114_2$.

The first link $114_1$ is able to transmit substantial tension and/or compression along its axis A20. The first link $114_1$ thereby limits movement in the axial direction $T_A$ of the surface mining machine 32 between the cab 74 and the mounting platform 82. The first link $114_1$ has only a minor effect on limiting movement between the cab 74 and the mounting platform 82 in directions other than the axial direction $T_A$. The second link $114_2$ is able to transmit substantial tension and/or compression along its axis A22. The second link $114_2$ thereby limits movement in the lateral direction $T_L$ of the surface mining machine 32 between the cab 74 and the mounting platform 82. The second link $114_2$ has only a minor effect on limiting movement between the cab 74 and the mounting platform 82 in directions other than the lateral direction $T_L$. The first and second links $114_1$, $114_2$ have substantial strength along their axial directions A20 and A22, respectively.

In certain embodiments, cab suspension systems in accordance with the principles of the present disclosure can be used in combination with a suspension system provided between an operator seat and the cab floor. The seat suspension system can include isolators (e.g., elastomeric isolators, springs, air cushions, etc.) for dampening vibrations transferred between the cab floor and the operator seat.

Referring to FIGS. 17-20, a supplemental attachment arrangement 302 is also provided for coupling the cab 74 to the platform 82. The supplemental attachment arrangement 302 allows the cab 74 to move relative to the platform 82, but limits the overall movement allowable by the suspension 72 and functions as a fail-safe that prevents the cab 74 from detaching from the platform 82 under extreme conditions. As depicted at FIGS. 17-20, the supplemental attachment arrangement 302 includes a vertical attachment bolt 300 that attaches the cab 74 to the platform 82 adjacent a rear corner 304 of the cab 74 adjacent the side of the cab 74 at which the four-bar linkage 100 is provided. The vertical attachment bolt 300 is configured to be adjustable, to limit the deflection of the cab suspension in an upward direction from a neutral position to an adjustable limit. In one embodiment, the adjustable limit ranges from 1.0 inches to 1.5 inches.

Surface mining machines and trenchers in accordance with the principles of the present disclosure can operate during excavation so as to provide the cutting teeth 50 with maximum tip speeds less 900 feet per minute or less than 850 feet per minute or less than 700 feet per minute. Surface mining machines and trenchers in accordance with the principles of present disclosure can have line pull (lbs) to machine weight (lbs) ratios of at least 0.2 or of at least 0.3. Line pull for a surface mining machine is the maximum force that can be applied by the drum 48 during excavation in a direction tangent to the circumference of the drum. Line pull for a trencher is the maximum force that can be applied by the chain during excavation along a line that extends along the length of the trencher boom.

From the foregoing detailed description, it will be evident that modifications and variations can be made in the devices of the disclosure without departing from the spirit and scope of the disclosure.

The invention claimed is:

1. An excavating machine comprising:
   a main chassis;
   a plurality of propulsion structures on which the main chassis is supported;
   an excavation component carried by the main chassis, the excavation component being selected from the group consisting of a surface mining drum and a digging chain mounted on a trenching boom;
   an engine supported on the main chassis for powering the propulsion structures and the excavation component;
   a cab supported on the main chassis, the cab including first and second ends spaced-apart from one another along a direction parallel with a length of the main chassis; and
   a suspension supporting the cab, the suspension including at least one cushion having a natural frequency less than 5 Hertz, the suspension also including an elastomeric dampener mounted nearer to the first end of the cab than to the at least one cushion, the suspension allowing for a vertical cab displacement of at least 0.5 inch upwardly from a neutral position and at least 0.5 inch downwards from the neutral position at the cushion;
   wherein the at least one cushion is mounted nearer to the second end of the cab than to the elastomeric dampener, the allowed vertical cab displacement at the cushion thereby configuring the suspension to provide larger vertical cab displacements at the second end of the cab than at the first end of the cab.

2. The excavating machine of claim 1, wherein the elastomeric dampener has a natural frequency that is greater than 10 Hertz.

3. The excavating machine of claim 1, wherein the main chassis defines the length that extends from a front end to a rear end of the main chassis, wherein the first end of the cab is closer to the engine than to the second end of the cab, wherein the second end of the cab is closer to the excavation component than the first end of the cab, wherein the suspension includes a plurality of the elastomeric dampeners mounted nearer to the first end of the cab than to the second end of the cab, and wherein the at least one cushion includes two air springs mounted nearer to the second end of the cab than to the plurality of the elastomeric dampeners.

4. The excavating machine of claim 3, wherein the cushion has a natural frequency less than 3 Hertz.

5. The excavating machine of claim 1, wherein the cab can be raised and lowered at least 2 feet in height relative to the main chassis.

6. The excavating machine of claim 5, wherein the cab is connected to the main chassis by a four-bar linkage used to raise and lower the cab relative to the main chassis.

7. The excavating machine of claim 1, wherein the cushion comprises an air cushion.

8. The excavating machine of claim 7, wherein the suspension includes at least two of the air cushions.

9. The excavating machine of claim 8, wherein the suspension includes at least two of the elastomeric dampeners each having a natural frequency substantially higher than the natural frequency of the cushions.

10. The excavating machine of claim 9, wherein the suspension includes at least two shock absorbing cylinders for dampening vertical movement of the cab allowed by the suspension.

11. The excavating machine of claim 10, wherein the suspension includes at least two panhard rods for limiting horizontal movement of the cab allowed by the suspension.

12. The excavating machine of claim 11, wherein the panhard rods are aligned perpendicular to one another.

13. The excavating machine of claim 10, wherein at least one of the shock absorbing cylinders is angled relative to vertical.

14. The excavating machine of claim 13, wherein at least one of the shock absorbing cylinders is vertically aligned.

15. The excavating machine of claim 14, wherein at least four of the shock absorbing cylinders are arranged as a set that corresponds to the cushion.

16. The excavating machine of claim 15, wherein a total rebound force of the set of shock absorbing cylinders is higher than a force of the cushion and a total compressive force of the set of shock absorbing cylinders is at least 20 percent of the force exerted by the cushion, and wherein the cushion is an air cushion.

17. The excavating machine of claim 1, wherein the cushion is an air cushion, and wherein a set of dashpots is provided corresponding to the air cushion.

18. The excavating machine of claim 17, wherein the set of dashpots provides a total rebound force higher than a force of the air cushion and a total compressive force of at least 20 percent of the force exerted by the air cushion.

19. The excavating machine of claim 1, wherein the propulsion structures include tracks.

20. The excavating machine of claim 1, further comprising a deflection limiter adapted to limit the vertical cab displacement in an upward direction from a neutral position to a limit, wherein the limit ranges from 1 inch to 1.5 inch.

21. The excavating machine of claim 1, wherein the at least one cushion includes at least two of the cushions mounted nearer to the second end of the cab than to the first end of the cab, wherein the suspension includes a plurality of the elastomeric dampeners mounted nearer to the first end of the cab than to the second end of the cab, and wherein the suspension is configured to allow the first end of the cab to pivot about the plurality of the elastomeric dampeners such that the plurality of the elastomeric dampeners form a hinge line/location of the suspension system.

22. The excavating machine of claim 1, wherein the at least one cushion is spaced from the elastomeric dampener along the direction parallel with the length of the main chassis, wherein the at least one cushion and the elastomeric dampener support the cab in a vertical direction, and wherein the suspension is thereby configured to isolate the cab from rotational pitch movement of the excavating machine.

23. The excavating machine of claim 22, wherein the suspension includes a plurality of the elastomeric dampeners mounted nearer to the first end of the cab than the second end of the cab and wherein isolation of the cab from the rotational pitch movement of the excavating machine includes the cab pivoting about a hinge line/location formed by the plurality of the elastomeric dampeners.

24. An excavating machine comprising:
a main chassis;
a plurality of propulsion structures on which the main chassis is supported;
an excavation component carried by the main chassis, the excavation component being selected from the group consisting of a surface mining drum and a digging chain mounted on a trenching boom;
an engine supported on the main chassis for powering the propulsion structures and the excavation component;
a cab supported on the main chassis, the cab including first and second ends spaced-apart from one another along a direction parallel with a length of the main chassis; and
a suspension supporting the cab, the suspension including at least one air spring, the suspension also including at least one elastomeric dampener having a natural frequency greater than a natural frequency of the air spring;
wherein the at least one elastomeric dampener is mounted nearer to the first end of the cab than to the at least one air spring and the at least one air spring is mounted nearer to the second end of the cab than to the at least one elastomeric dampener, thereby allowing a larger vertical cab displacement at the second end of the cab than at the first end of the cab and further allowing isolation of the cab from rotational pitch movement of the excavating machine.

25. A surface mining machine comprising:
a main chassis having a length that extends between a front end and a rear end;
a plurality of propulsion structures on which the main chassis is supported;
a boom pivotally mounted to the main chassis adjacent the rear end of the main chassis, the boom being pivotally movable about a pivot axis relative to the main chassis, the boom being pivotally movable about the pivot axis between a raised position and a lowered position;
a drum mounted to the boom, the drum being rotatable relative to the boom about an axis of rotation that extends along a width of the main chassis;
a plurality of teeth carried by the drum;
an engine supported on the main chassis that provides power for driving the propulsion structures and for rotating the drum about the axis of rotation;
a cab mounted on a platform, the platform being forwardly offset from the boom;
a lift arrangement for raising and lowering the platform and the cab relative to the main chassis, the platform and the cab being movable by the lift arrangement between a raised position and a lowered position, the raised position being at least 3 feet above the lowered position; and
a suspension positioned between the platform and the cab, the suspension including air cushions positioned adjacent a rearward region of the cab and elastomeric dampeners positioned adjacent a forward region of the cab, the air cushions allowing for a larger displacement than the elastomeric dampeners, and the air cushions having a lower natural frequency than the elastomeric dampeners.

26. The surface mining machine of claim 25, further comprising two shock absorbing cylinders for dampening vertical movement of the cab relative to the platform.

27. The surface mining machine of claim 26, further comprising panhard rods for limiting horizontal movement of the cab relative to the platform.

28. The surface mining machine of claim 25, wherein cab weight is at least 5,000 pounds and thereby is adapted to assist in dampening vibration applied to the cab from the main chassis.

29. The surface mining machine of claim 25, wherein the cab is a roll over module adapted to withstand crushing loads applied by the surface mining machine.

* * * * *